United States Patent
Kato et al.

(10) Patent No.: US 10,855,140 B2
(45) Date of Patent: Dec. 1, 2020

(54) ELECTRIC ACTUATOR AND ACTUATOR DEVICE

(71) Applicant: NIDEC TOSOK CORPORATION, Kanagawa (JP)

(72) Inventors: Shun Kato, Kanagawa (JP); Yutaka Uematsu, Kanagawa (JP); Tadayuki Hatsuda, Kanagawa (JP); Yuzo Akasaka, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 68 days.

(21) Appl. No.: 16/234,591

(22) Filed: Dec. 28, 2018

(65) Prior Publication Data
US 2019/0207473 A1 Jul. 4, 2019

(30) Foreign Application Priority Data
Dec. 28, 2017 (JP) .................................. 2017-253674

(51) Int. Cl.
*H02K 7/116* (2006.01)
*H02K 7/08* (2006.01)
(Continued)

(52) U.S. Cl.
CPC ......... *H02K 7/116* (2013.01); *F16H 63/3466* (2013.01); *H02K 5/08* (2013.01);
(Continued)

(58) Field of Classification Search
CPC ........ H02K 7/116; H02K 7/083; H02K 21/14; H02K 11/215; H02K 5/225; H02K 5/1732;
(Continued)

(56) References Cited

U.S. PATENT DOCUMENTS

| 5,408,153 | A | * | 4/1995 | Imai | ....................... G11B 19/20 310/156.05 |
| 2006/0125439 | A1 | * | 6/2006 | Ajima | ..................... B60L 50/16 318/716 |

(Continued)

FOREIGN PATENT DOCUMENTS

| JP | 2008002555 | 1/2008 |
| JP | 2009065742 | 3/2009 |
| JP | 2010159828 | 7/2010 |

*Primary Examiner* — John K Kim
(74) *Attorney, Agent, or Firm* — JCIPRNET

(57) ABSTRACT

An electric actuator includes: a motor part, having a motor shaft that extends in an axial direction and is rotated in both directions; a deceleration mechanism, connected to the motor shaft; a circuit board, electrically connected to the motor part; an output part, having an output shaft to which rotation of the motor shaft is transmitted through the deceleration mechanism; a sensor magnet, attached to the motor shaft; and a motor part sensor, detecting a magnetic field of the sensor magnet and detecting rotation of the motor shaft. The motor part has a rotor magnet that is fixed to the motor shaft. The rotor magnet and the sensor magnet each have multiple magnetic poles in a circumferential direction around the motor shaft. The magnetic poles of the rotor magnet and the magnetic poles of the sensor magnet are disposed to be shifted from each other in the circumferential direction.

8 Claims, 9 Drawing Sheets

(51) Int. Cl.
*H02K 21/14* (2006.01)
*H02K 11/215* (2016.01)
*H02K 5/22* (2006.01)
*H02K 5/173* (2006.01)
*H02K 5/08* (2006.01)
*F16H 63/34* (2006.01)
*G01D 5/14* (2006.01)

(52) U.S. Cl.
CPC ........... *H02K 5/1732* (2013.01); *H02K 5/225* (2013.01); *H02K 7/083* (2013.01); *H02K 11/215* (2016.01); *H02K 21/14* (2013.01); *G01D 5/14* (2013.01); *H02K 2211/03* (2013.01)

(58) Field of Classification Search
CPC .. H02K 5/08; H02K 2211/03; F16H 63/3466; F16H 63/3425; G01D 5/14

USPC ...................................................... 310/68 B
See application file for complete search history.

(56) References Cited

U.S. PATENT DOCUMENTS

| | | | |
|---|---|---|---|
| 2006/0276300 A1* | 12/2006 | Kashiwagi | F16H 61/12 477/34 |
| 2013/0099609 A1* | 4/2013 | Ikeno | H02K 11/33 310/52 |
| 2013/0110364 A1* | 5/2013 | Yamada | F16H 59/105 701/61 |
| 2013/0110365 A1* | 5/2013 | Kimura | F16H 61/32 701/65 |
| 2019/0207473 A1* | 7/2019 | Kato | H02K 21/14 |

* cited by examiner

ELECTRIC ACTUATOR AND ACTUATOR DEVICE

CROSS REFERENCE TO RELATED APPLICATIONS

The application claims priority under 35 U.S.C. § 119 to Japanese Patent Application No. 2017-253674 filed on Dec. 28, 2017, the entire content of which is incorporated herein by reference and made a part of this specification.

BACKGROUND

Technical Field

The disclosure relates to an electric actuator and an actuator device.

Description of Related Art

In the related art, an electric actuator mounted on an automatic transmission that shifts an engine output for running a vehicle includes generally a motor part, a deceleration mechanism connected to the motor part, and an output part to which rotation of the motor part is transmitted through the deceleration mechanism.

In the electric actuator described above, for a direction of rotation output from the output part, both directions may be used. In this case, when an output required in one rotation direction is different from an output required in the other rotation direction, it is necessary to determine a maximum output of the electric actuator according to the larger output. Therefore, there is a problem of the size of the electric actuator increasing according to the larger output regardless of the smaller output. Here, when an output required in one rotation direction is different from an output required in the other rotation direction in the electric actuator described above, for example, the electric actuator may be an electric actuator that switches a parking switching mechanism mounted on an automatic transmission.

SUMMARY

The disclosure provides an electric actuator in which both directions are used as a rotation direction of an output and having a structure in which a size increase can be reduced and an actuator device including the electric actuator.

An electric actuator according to one of the disclosure includes: a motor part having a motor shaft that extends in an axial direction and is rotated in both directions; a deceleration mechanism that is connected to the motor shaft; a circuit board that is electrically connected to the motor part; an output part having an output shaft to which rotation of the motor shaft is transmitted through the deceleration mechanism; a sensor magnet that is attached to the motor shaft; and a motor part sensor that detects a magnetic field of the sensor magnet and detects rotation of the motor shaft. The motor part has a rotor magnet that is fixed to the motor shaft. The rotor magnet and the sensor magnet each have a plurality of magnetic poles in a circumferential direction around the motor shaft. The magnetic poles of the rotor magnet and the magnetic poles of the sensor magnet are disposed to be shifted from each other in the circumferential direction.

An actuator device according to one of the disclosure includes the above electric actuator, a movable part that is connected to the output shaft, and a lock arm that moves when the movable part moves. The electric actuator switches a position of the movable part between at least a lock position and a non-lock position. The lock arm engages with a lock gear at the lock position and is disengaged from the lock gear at the non-lock position. The motor shaft rotates in a first rotation direction when the movable part is moved from the lock position to the non-lock position by the electric actuator. The magnetic poles of the sensor magnet are disposed to be shifted in the first rotation direction with respect to the magnetic poles of the rotor magnet.

According to one of the disclosure, there are provided an electric actuator in which both directions are used as a rotation direction of an output and having a structure in which a size increase can be reduced and an actuator device including the electric actuator.

The above and other elements, features, steps, characteristics and advantages of the disclosure will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DESCRIPTION OF THE EMBODIMENTS

Figure 1:
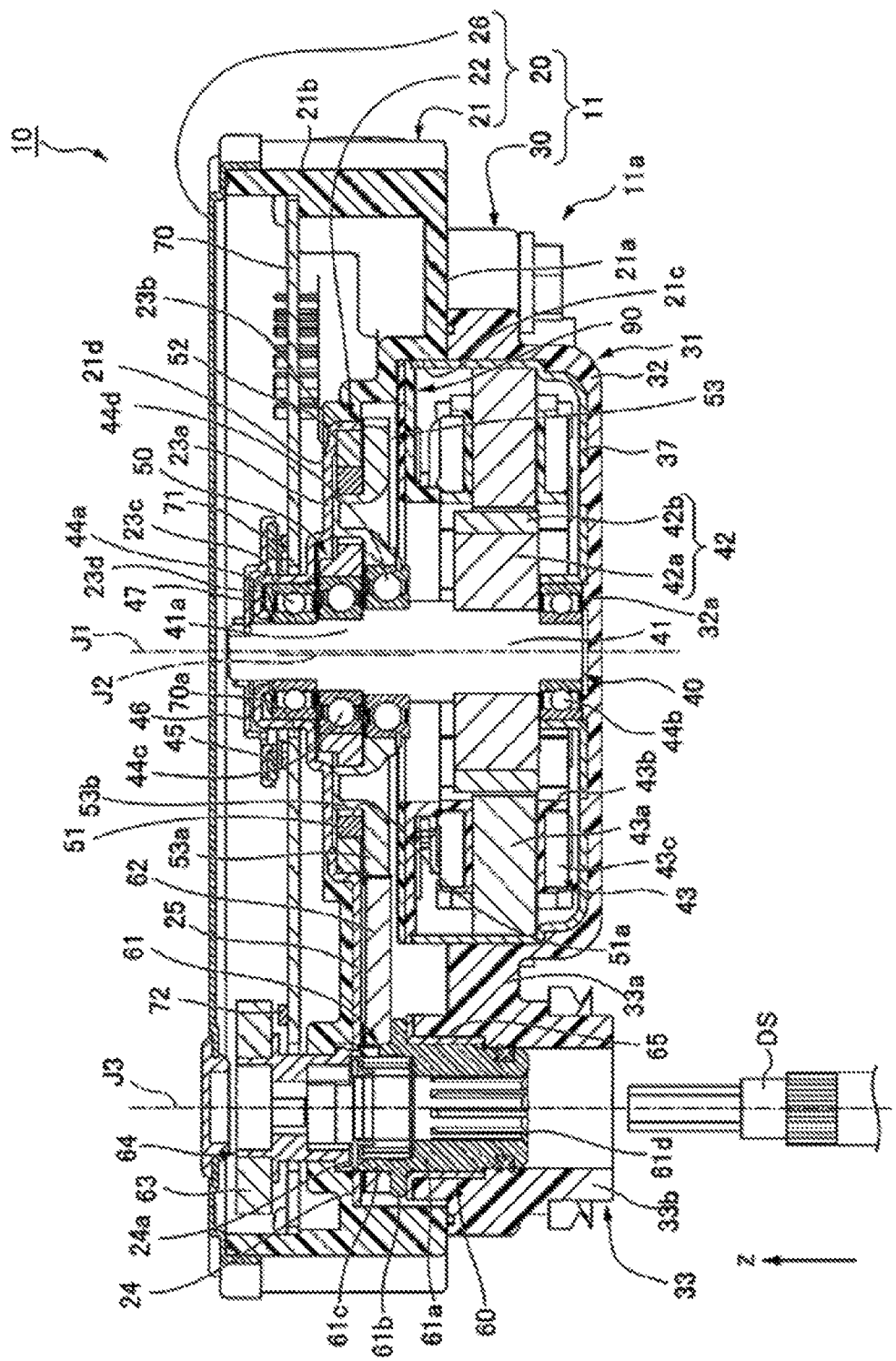
FIG. 1 is a cross-sectional view showing an electric actuator of the present embodiment.

In the drawings, a Z axis direction is a vertical direction in which the positive side is the upper side and the negative side is the lower side. An axial direction of a central axis J1 which is a virtual axis appropriately shown in the drawings is parallel to the Z axis direction, that is, the vertical direction. In the following description, a direction parallel to the axial direction of the central axis J1 will be simply referred to as an "axial direction Z." In addition, unless otherwise noted, a radial direction with respect to the central axis J1 will be simply referred to as a "radial direction," and a circumferential direction with respect to the central axis J1 will be simply referred to as a "circumferential direction." In addition, when viewed from the above, a clockwise rotation direction with respect to an axis that extends in the axial direction Z such as the central axis J1 will be referred to as a "first rotation direction θ1" and a counterclockwise rotation direction with respect to the central axis J1 will be referred to as a "second rotation direction θ2."

In the present embodiment, the upper side corresponds to one side in the axial direction and the lower side corresponds to the other side in the axial direction. Here, the upper side and the lower side are only names for describing relative positional relationships between respective parts, and actual disposition relationships and the like may be disposition relationships or the like other than disposition relationships indicated by such names.

First, an embodiment of an electric actuator will be described.

Figure 2:
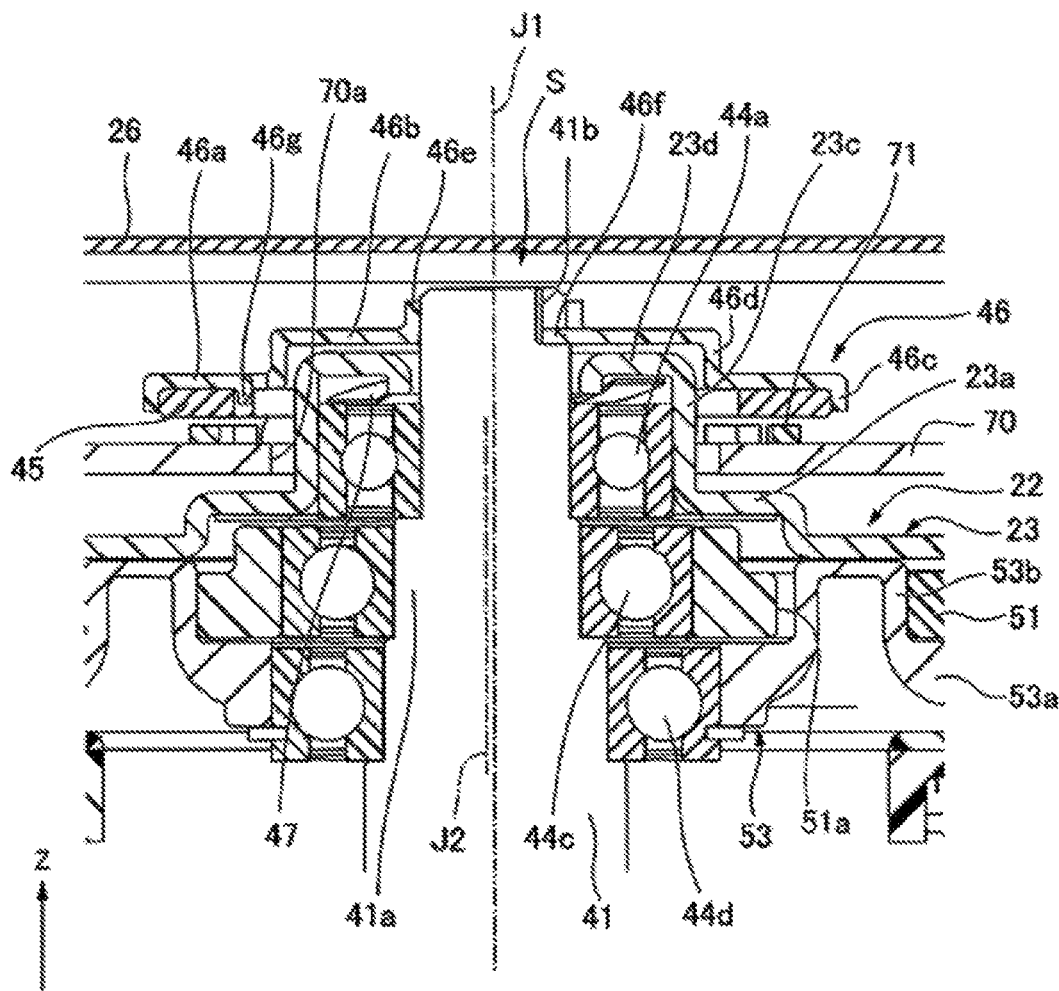
FIG. 2 is a cross-sectional view showing a part of the electric actuator of the present embodiment and a partially enlarged view of FIG. 1.

An electric actuator 10 of the present embodiment shown in FIG. 1 and FIG. 2 is attached to a vehicle. More specifically, the electric actuator 10 is mounted on a shift-by-wire type actuator device that is driven based on a shift operation performed by a driver of a vehicle. As shown in FIG. 1, the electric actuator 10 includes a motor part 40, a deceleration mechanism 50, an output part 60, a circuit board 70, a motor part sensor 71, an output part sensor 72, a housing 11, a bus bar holder 90, and a bus bar (not shown).

The motor part 40 includes a motor shaft 41, a first bearing 44a, a second bearing 44b, a third bearing 44c, a fourth bearing 44d, a rotor main body 42, a stator 43, a sensor magnet for a motor part 45, and a magnet holder 46.

The motor shaft 41 extends in the axial direction Z. The motor shaft 41 is rotated in both directions. That is, the motor shaft 41 may be rotated in the first rotation direction θ1 or rotated in the second rotation direction θ2. The first bearing 44a, the second bearing 44b, the third bearing 44c, and the fourth bearing 44d support the motor shaft 41 so that it is rotatable with respect to the central axis J1. In the present embodiment, the first bearing 44a, the second bearing 44b, the third bearing 44c, and the fourth bearing 44d are, for example, a ball bearing.

An eccentric shaft part 41a which is a part of the motor shaft 41 supported by the third bearing 44c has a cylindrical shape that extends with respect to an eccentric shaft J2 that is parallel to the central axis J1 and eccentric with respect to the central axis J1. A part of the motor shaft 41 other than the eccentric shaft part 41a has a cylindrical shape that extends with respect to the central axis J1.

Figure 3:
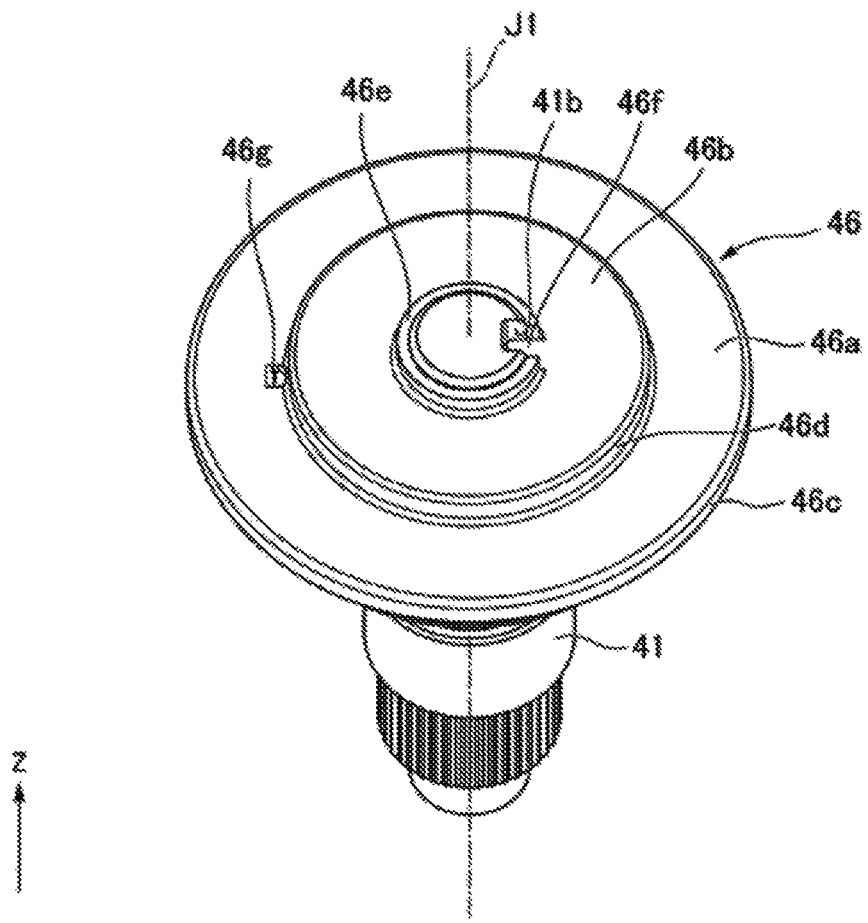
FIG. 3 is a perspective view showing a motor shaft and a magnet holder of the present embodiment.

As shown in FIG. 2 and FIG. 3, the motor shaft 41 has a positioning recess 41b. The positioning recess 41b is recessed in a radially inward direction from the outer circumferential surface at the upper side end of the motor shaft 41. The positioning recess 41b opens on the upper side. In the present embodiment, the positioning recess 41b corresponds to a first positioning part.

As shown in FIG. 1, the rotor main body 42 is fixed to the motor shaft 41. More specifically, the rotor main body 42 is fixed to a lower side part of the motor shaft 41. The rotor main body 42 includes a rotor core 42a and a rotor magnet 42b. That is, the motor part 40 includes the rotor core 42a and the rotor magnet 42b. The rotor core 42a is fixed to the outer circumferential surface of a part of the motor shaft 41 that is lower than the eccentric shaft part 41a. The rotor magnet 42b is fixed to the outer circumferential surface of the rotor core 42a. Thereby, the rotor magnet 42b is fixed to the motor shaft 41 via the rotor core 42a.

The stator 43 is disposed radially outward from the rotor main body 42 via a gap. The stator 43 has an annular shape that surrounds the outside of the rotor main body 42 in the radial direction. The stator 43 includes a stator core 43a, an insulator 43b, and a plurality of coils 43c. The coil 43c is attached to the stator core 43a via the insulator 43b.

As shown in FIG. 3, the magnet holder 46 has an annular shape centered on the central axis J1. The magnet holder 46 is made of, for example, a metal. In the present embodiment, the magnet holder 46 is a single member formed by pressing a metal plate member. The magnet holder 46 is attached to the motor shaft 41. More specifically, the magnet holder 46 is fixed to the outer circumferential surface at the upper side end of the motor shaft 41. As shown in FIG. 2, the magnet holder 46 is disposed above the circuit board 70. The magnet holder 46 includes a first annular plate part 46a, a second annular plate part 46b, a first cylindrical part 46c, a second cylindrical part 46d, a third cylindrical part 46e, a supported part 46f, and a positioning convex part 46g.

As shown in FIG. 3, the first annular plate part 46a and the second annular plate part 46b have an annular shape centered on the central axis J1 and have a plate shape with a plate surface that is orthogonal to the axial direction Z. As shown in FIG. 2, the first annular plate part 46a is disposed above a part of the circuit board 70 that is radially outward from a through-hole 70a to be described below. The second annular plate part 46b is disposed above the first annular plate part 46a in a radially inward direction. The second annular plate part 46b is disposed above the through-hole 70a. The outer diameter of the second annular plate part 46b is smaller than the outer diameter of the first annular plate part 46a.

As shown in FIG. 3, the first cylindrical part 46c has a cylindrical shape that protrudes from the outer edge of the first annular plate part 46a in the radial direction to the lower side. The second cylindrical part 46d has a cylindrical shape that protrudes from the inner edge of the first annular plate part 46a in the radial direction to the upper side. The outer edge of the second annular plate part 46b in the radial direction is connected to the upper side end of the second cylindrical part 46d. That is, the second cylindrical part 46d connects the inner edge of the first annular plate part 46a in the radial direction and the outer edge of the second annular plate part 46b in the radial direction. The outer diameter and the inner diameter of the second cylindrical part 46d are smaller than the outer diameter and the inner diameter of the first cylindrical part 46c.

The third cylindrical part 46e has a tubular shape that protrudes from the inner edge of the second annular plate part 46b in the radial direction to the upper side. The third cylindrical part 46e has a shape in which a part of a cylinder in the circumferential direction is cut out and has a C-shape that opens in one direction among radial directions when viewed in the axial direction Z. The upper side end of the third cylindrical part 46e is the upper side end of the magnet holder 46. The outer diameter and the inner diameter of the third cylindrical part 46e are smaller than the outer diameter and the inner diameter of the second cylindrical part 46d. The upper side end of the motor shaft 41 is fitted to the third cylindrical part 46e in a radially inward direction. The upper side end of the motor shaft 41 protrudes slightly upward from the third cylindrical part 46e.

Figure 4:
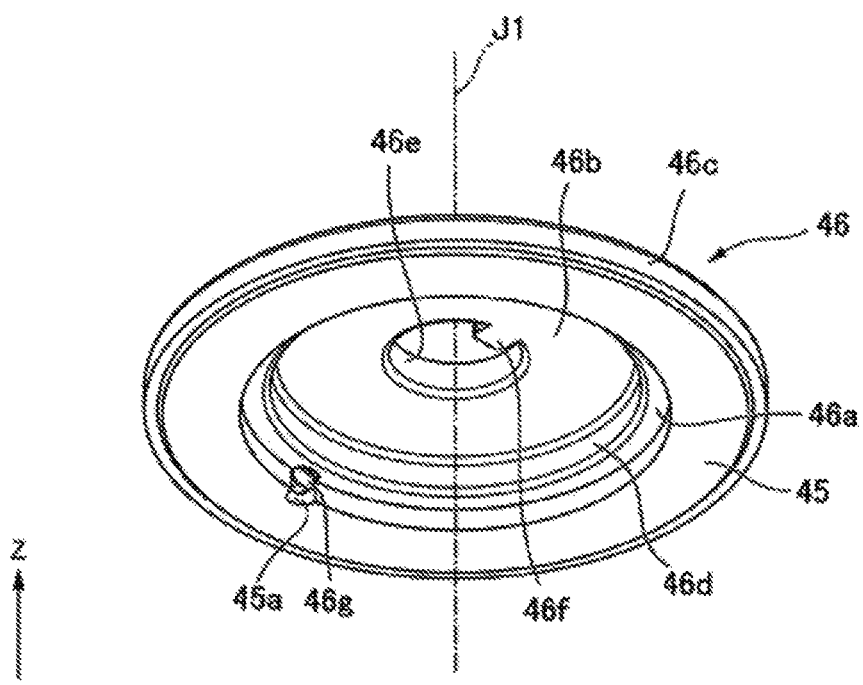
FIG. 4 is a perspective view showing a sensor magnet for a motor part and the magnet holder of the present embodiment.

As shown in FIG. 3 and FIG. 4, the supported part 46f protrudes in a radially inward direction from the inner edge of the second annular plate part 46b in the radial direction. The supported part 46f has a plate shape with a plate surface that is orthogonal to the axial direction Z. The supported part 46f protrudes in a radially inward direction from the third cylindrical part 46e via a part in which the C-shaped third cylindrical part 46e opens in the radial direction. The supported part 46f has a substantially rectangular shape when viewed in the axial direction Z. As shown in FIG. 3, the supported part 46f is fitted into the positioning recess 41b. Thereby, the supported part 46f is caught on side surfaces positioned on both sides in the circumferential direction among inner surfaces of the positioning recess 41b, and the magnet holder 46 can be positioned in the circumferential direction with respect to the motor shaft 41. In the present embodiment, the supported part 46f corresponds to a convex part.

As shown in FIG. 2, the supported part 46f comes in contact with and is supported by the bottom surface positioned on the lower side among inner surfaces of the positioning recess 41b. Thereby, the supported part 46f is supported by a part of the motor shaft 41 from below. Therefore, it is possible to position the magnet holder 46 in the axial direction with respect to the motor shaft 41 and it is possible to prevent the magnet holder 46 from being displaced downward with respect to the motor shaft 41.

The positioning convex part 46g protrudes from the inner edge of the first annular plate part 46a in the radial direction to the lower side. The positioning convex part 46g is formed by, for example, cutting and raising a part of the first annular plate part 46a downward. The lower side end of the positioning convex part 46g is disposed above the lower side end of the first cylindrical part 46c. In the present embodiment, the positioning convex part 46g corresponds to a second positioning part.

As shown in FIG. 4, the sensor magnet for a motor part 45 has an annular plate shape centered on the central axis J1. A plate surface of the sensor magnet for a motor part 45 is orthogonal to the axial direction Z. The sensor magnet for a motor part 45 is fixed to the magnet holder 46. More specifically, the sensor magnet for a motor part 45 is fitted to the first cylindrical part 46c in a radially inward direction and is fixed to a lower side surface of the first annular plate part 46a using an adhesive or the like. Thereby, the sensor magnet for a motor part 45 is a sensor magnet that is attached to the motor shaft 41 via the magnet holder 46. In the present embodiment, the magnet holder 46 corresponds to a sensor magnet holder.

Figure 5:
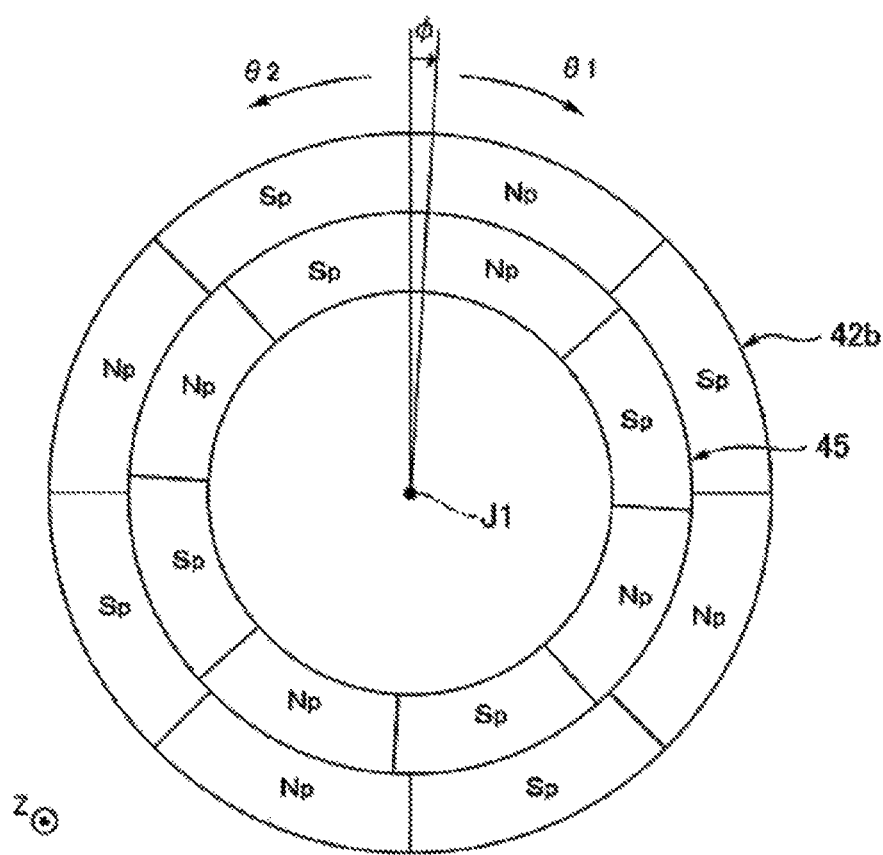
FIG. 5 is a schematic view of a rotor magnet and a sensor magnet for a motor part of the present embodiment when viewed from above.

As shown in FIG. 5, the rotor magnet 42b and the sensor magnet for a motor part 45 each have a plurality of magnetic poles Np and Sp in the circumferential direction of the motor shaft 41. The magnetic pole Np is a magnetic pole with an N pole. The magnetic pole Sp is a magnetic pole with an S pole. In each of the rotor magnet 42b and the sensor magnet for a motor part 45, four magnetic poles Np and four magnetic poles Sp are provided. That is, the rotor magnet 42b and the sensor magnet for a motor part 45 are a magnet with 8 poles. In each of the rotor magnet 42b and the sensor magnet for a motor part 45, the magnetic poles Np and the magnetic poles Sp are alternately disposed in the circumferential direction.

The magnetic poles Np and Sp of the rotor magnet 42b and the magnetic poles Np and Sp of the sensor magnet for a motor part 45 are disposed to be shifted from each other in the circumferential direction. In FIG. 5, the magnetic poles Np and Sp of the sensor magnet for a motor part 45 are disposed to be shifted from the magnetic poles Np and Sp of the rotor magnet 42b by an angle φ in the first rotation direction θ1. The angle φ is, for example, 0.1° or more and 5° or less.

In this specification, "magnetic poles of the rotor magnet and magnetic poles of the sensor magnet are disposed to be shifted from each other in the circumferential direction" means that positions of parts having the largest magnetic force of magnetic poles in the circumferential direction are different and shifted from each other in the rotor magnet and the sensor magnet. That is, in FIG. 5, while the angle φ is shown based on the boundary between the magnetic pole Np and the magnetic pole Sp in the circumferential direction, the angle φ may be an angle at which the magnetic poles Np and Sp are shifted based on parts having the largest magnetic force in the magnetic poles Np and Sp.

In addition, in this specification, magnetic poles that are shifted from each other may be the same magnetic pole or different magnetic poles. That is, "magnetic poles of the rotor magnet and magnetic poles of the sensor magnet are disposed to be shifted from each other in the circumferential direction" means that a change in the absolute value of the magnetic force with respect to the positions of the magnets in the circumferential direction may be a change in which phases are different between the magnets. In other words, in the circumferential direction, a change in the absolute value of the magnetic force of the rotor magnet and a change in the absolute value of the magnetic force of the sensor magnet may be different in phase.

For example, in FIG. 5, while the magnetic pole Np of the rotor magnet 42b and the magnetic pole Np of the sensor magnet for a motor part 45 are disposed at almost the same position in the circumferential direction and are shifted by an angle φ, the magnetic pole Np of the rotor magnet 42b and the magnetic pole Sp of the sensor magnet for a motor part 45 may be disposed at almost the same position in the circumferential direction and shifted by an angle φ.

Figure 6:
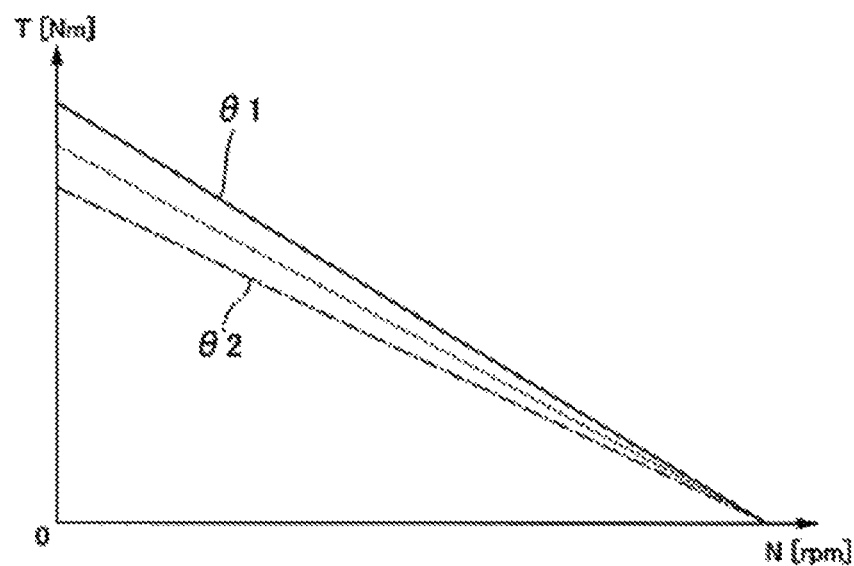
FIG. 6 is a graph showing a relationship between a rotational speed and a rotational torque of the motor shaft in the electric actuator of the present embodiment.

When the magnetic poles Np and Sp of the rotor magnet 42b and the magnetic poles Np and Sp of the sensor magnet for a motor part 45 are disposed to be shifted from each other in the circumferential direction, the relationship between a rotational speed N [rpm] of the motor shaft 41 and a rotational torque T [Nm] of the motor shaft 41 is a relationship shown by a solid line and a dash-dotted line in FIG. 6. Here, the dashed line shown in FIG. 6 shows a relationship between the rotational speed N and the rotational torque T when the magnetic poles Np and Sp of the rotor magnet 42b and the magnetic poles Np and Sp of the sensor magnet for a motor part 45 are not shifted from each other in the circumferential direction. As shown in FIG. 6, the rotational torque T becomes smaller as the rotational speed N becomes higher. The rotational torque T linearly changes with respect to the rotational speed N.

A value of the rotational torque T with respect to the rotational speed N differs depending on whether the rotation direction of the motor shaft 41 is the first rotation direction θ1 or the second rotation direction θ2. Specifically, when the rotational speed N is the same, the rotational torque T is higher when the rotation direction of the motor shaft 41 is the first rotation direction θ1 than when the rotation direction of the motor shaft 41 is the second rotation direction θ2. In addition, when the rotation direction of the motor shaft 41 is the first rotation direction θ1, the rotational torque T is larger than when the magnetic poles Np and Sp of the magnets are not shifted. On the other hand, when the rotation direction of the motor shaft 41 is the second rotation direction θ2, the rotational torque T is smaller than when the magnetic poles Np and Sp of the magnets are not shifted.

The reason why the relationship between the rotational speed N and the rotational torque T is the above relationship is as follows. A little time is taken from when the motor part sensor 71 detects rotation of the motor shaft 41 until a current supplied to the stator 43 is switched based on the detection result. Thus, during a period from when it is detected that the position of the motor shaft 41 has reached a position appropriate for switching a current supplied to the stator 43 until a current actually supplied to the stator 43 is switched, the motor shaft 41 rotates, and current supplied to the stator 43 is switched at a position at which the motor shaft 41 is slightly shifted. Thus, the rotational torque T of the motor shaft 41 is lower compared to when a current supplied to the stator 43 is switched at an appropriate timing.

When the magnetic poles Np and Sp of the rotor magnet and the magnetic poles Np and Sp of the magnet for the sensor part are not shifted from each other, irrespective of whether the motor shaft 41 is rotated in the first rotation direction θ1 or the second rotation direction θ2, the rotational torque T described above decreases. Thus, a value of the rotational torque T with respect to the rotational speed N does not change irrespective of whether the motor shaft 41 is rotated in the first rotation direction θ1 or the second rotation direction θ2. On the other hand, a value of the rotational torque T is smaller than a maximum value of the rotational torque T that the motor part can output.

On the other hand, in the present embodiment, the magnetic poles Np and Sp of the sensor magnet for a motor part 45 are disposed to be shifted in the first rotation direction θ1 with respect to the magnetic poles Np and Sp of the rotor magnet 42b. Therefore, a rotation position of the motor shaft 41 detected by the motor part sensor 71 is a position that is actually shifted from the rotation position of the motor shaft 41 in the first rotation direction θ1. Thereby, when the rotation direction of the motor shaft 41 is the first rotation direction θ1, the motor part sensor 71 detects that the motor shaft 41 has reached a current switching position before the motor shaft 41 has actually reached a current switching position.

Therefore, when a current supplied to the stator 43 is switched based on the detection result of the motor part sensor 71, it is possible to switch a current supplied to the stator 43 when the rotation position of the motor shaft 41 has actually reached an appropriate position. Thereby, it is possible to switch a current supplied to the stator 43 at an appropriate timing and it is possible to prevent the rotational torque T of the motor shaft 41 from decreasing. Therefore, when the motor shaft 41 is rotated in the first rotation direction θ1, a value of the rotational torque T can be set to a maximum value of the rotational torque T that the motor part 40 can output.

On the other hand, when the motor shaft 41 rotates in the second rotation direction θ2, the motor part sensor 71 detects that the motor shaft 41 has reached a current switching position after the motor shaft 41 has actually passed the current switching position. Therefore, a timing at which a current supplied to the stator 43 is switched is later than when the magnetic poles Np and Sp of the magnets are not shifted from each other. Thereby, the rotational torque T with respect to the rotational speed N is smaller than when the magnetic poles Np and Sp of the magnets are not shifted from each other.

As described above, when the motor shaft 41 rotates in the first rotation direction θ1, the rotational torque T in the present embodiment is larger than when the magnetic poles Np and Sp of the magnets are not shifted, and when the motor shaft 41 rotates in the second rotation direction θ2, the rotational torque T is smaller than when the magnetic poles Np and Sp of the magnets are not shifted.

According to the present embodiment, as described above, the rotational torque T when the motor shaft 41 is rotated in the first rotation direction θ1 can be set to be larger than when the magnetic poles Np and Sp of the magnets are not shifted. Therefore, it is possible to increase an output of the electric actuator 10 when the motor shaft 41 is rotated in the first rotation direction θ1. Thereby, when a required output of the electric actuator 10 varies depending on the rotation direction, if a rotation direction in which a required output is larger is set as the first rotation direction θ1, it is possible to prevent the size of the electric actuator 10 from increasing and obtain a necessary output. On the other hand, while the rotational torque T when the motor shaft 41 is rotated in the second rotation direction θ2 decreases, a rotation direction in which a required output is larger is set as the first rotation direction θ1, and thus the second rotation direction θ2 can be set as a rotation direction in which a required output is smaller. Therefore, it is easy to obtain a required output. As described above, according to the present embodiment, it is possible to obtain the electric actuator 10 which is an electric actuator in which both directions are used as an output rotation direction and has a structure in which a size increase can be reduced.

In addition, for example, it is conceivable to perform control such that switching of a current supplied to the stator 43 is shifted without shifting the magnets in the circumferential direction. However, in this case, a control program tends to be complicated and the production cost of the electric actuator may increase. On the other hand, according to the present embodiment, when the magnets are shifted in the circumferential direction, it is possible to increase an output of the electric actuator 10 in the first rotation direction θ1 without changing a control program. Therefore, it is possible to obtain the electric actuator 10 of which the production cost can be prevented from increasing and in which a size increase can be reduced.

In addition, according to the present embodiment, the positioning recess 41b as the first positioning part that allows the sensor magnet for a motor part 45 to be positioned in the circumferential direction with respect to the motor shaft 41 is provided in the motor shaft 41. Therefore, it is easy to position the sensor magnet for a motor part 45 with the magnetic poles Np and Sp shifted with respect to the rotor magnet 42b.

In addition, according to the present embodiment, the first positioning part is the positioning recess 41b which is a recess that is recessed in a radially inward direction from the outer circumferential surface of the motor shaft 41. Therefore, when the supported part 46f as a convex part is fitted to the positioning recess 41b, the magnet holder 46 to which the sensor magnet for a motor part 45 is fixed can be easily positioned with respect to the motor shaft 41. Therefore, it is easier to position the sensor magnet for a motor part 45 with the magnetic poles Np and Sp shifted with respect to the rotor magnet 42b.

As described above, the magnet holder 46 is disposed above the circuit board 70. Thereby, as shown in FIG. 2, in the present embodiment, the sensor magnet for a motor part 45 is attached to a part of the motor shaft 41 that protrudes to the upper side from the circuit board 70. The sensor magnet for a motor part 45 faces the upper side surface of the circuit board 70 in the axial direction Z via a gap.

Here, in this specification, "a part of the motor shaft to which a detected part is attached" is a part of the motor shaft with which a detected part comes in contact when the detected part is directly fixed to the motor shaft and is a part of the motor shaft with which a detected part holder comes in contact when the detected part is indirectly fixed to the motor shaft via the detected part holder. In the present embodiment, since the sensor magnet for a motor part 45 as a detected part is fixed to the motor shaft 41 via the magnet holder 46 as a detected part holder, a part of the motor shaft 41 to which the sensor magnet for a motor part 45 is attached is a part of the motor shaft 41 with which the magnet holder 46 comes in contact.

In the present embodiment, the part of the motor shaft 41 to which the sensor magnet for a motor part 45 is attached is disposed above the first bearing 44a. That is, the first bearing 44a supports a part below the part of the motor shaft 41 to which the sensor magnet for a motor part 45 is attached. Therefore, compared to when the first bearing 44a supports a part above the part of the motor shaft 41 to which the sensor magnet for a motor part 45 is attached, it is easy to reduce the size of the electric actuator 10 in the axial direction Z.

As shown in FIG. 4, the sensor magnet for a motor part 45 has a positioning recess 45a. The positioning recess 45a is recessed radially outward from the inner edge of the sensor magnet for a motor part 45 in the radial direction. The positioning recess 45a penetrates the sensor magnet for a motor part 45 in the axial direction Z. The positioning convex part 46g is fitted into the positioning recess 45a. Thereby, the positioning convex part 46g is caught on side surfaces positioned on both sides in the circumferential direction among inner surfaces of the positioning recess 45a, and the sensor magnet for a motor part 45 can be positioned in the circumferential direction with respect to the magnet holder 46. That is, the positioning convex part 46g allows the sensor magnet for a motor part 45 to be positioned in the circumferential direction with respect to the magnet holder 46. Therefore, according to the supported part 46f and the positioning recess 41b, and the positioning convex part 46g and the positioning recess 45a, the sensor magnet for a motor part 45 can be positioned in the circumferential direction with respect to the motor shaft 41, and it is easier to position the magnetic poles Np and Sp shifted with respect to the rotor magnet 42b.

As shown in FIG. 1, the deceleration mechanism 50 is connected to the upper side of the motor shaft 41. The deceleration mechanism 50 is disposed above the rotor main body 42 and the stator 43. The deceleration mechanism 50 includes an external gear 51, an internal gear 52, and an output gear 53.

Although not shown, the external gear 51 has an annular plate shape that extends in the radial direction of the eccentric shaft J2 with respect to the eccentric shaft J2 of the eccentric shaft part 41a. A gear part is provided on the outer surface of the external gear 51 in the radial direction. The external gear 51 is connected to the motor shaft 41 through the third bearing 44c. Thereby, the deceleration mechanism 50 is connected to the motor shaft 41. The external gear 51 is fitted to an outer ring of the third bearing 44c from the outside in the radial direction. Thereby, the third bearing 44c connects the motor shaft 41 and the external gear 51 around the eccentric shaft J2 in a relatively rotatable manner.

The external gear 51 has a plurality of holes 51a that penetrate the external gear 51 in the axial direction Z. Although not shown, the plurality of holes 51a are disposed at equal intervals over one circumference in the circumferential direction with respect to the eccentric shaft J2. The shape of the hole 51a when viewed in the axial direction Z is a circular shape.

The internal gear 52 surrounds the outside of the external gear 51 in the radial direction, is fixed to a circuit board case 20, and engages with the external gear 51. The internal gear 52 is held in a metal member 22 (to be described below) of the housing 11. The internal gear 52 has an annular shape centered on the central axis J1. A gear part is provided on the inner circumferential surface of the internal gear 52. The gear part of the internal gear 52 engages with the gear part of the external gear 51.

The output gear 53 includes an output gear main body 53a and a plurality of pins 53b. The output gear main body 53a is disposed below the external gear 51 and the internal gear 52. The output gear main body 53a has an annular plate shape that extends in the radial direction with respect to the central axis J1. A gear part is provided on the outer surface of the output gear main body 53a in the radial direction. The output gear main body 53a is connected to the motor shaft 41 through the fourth bearing 44d.

The plurality of pins 53b have a cylindrical shape that protrudes from the upper surface of the output gear main body 53a to the upper side. Although not shown, the plurality of pins 53b are disposed at equal intervals over one circumference in the circumferential direction. The outer diameter of the pin 53b is smaller than the inner diameter of the hole 51a. The plurality of pins 53b pass through the plurality of holes 51a from the lower side. The outer circumferential surface of the pin 53b is inscribed in the inner circumferential surface of the hole 51a. The inner circumferential surface of the hole 51a supports the external gear 51 through the pin 53b in such a manner that it is swingable around the central axis J1.

The output part 60 is a part that outputs a driving force of the electric actuator 10. The output part 60 is disposed outside the motor part 40 in the radial direction. The output part 60 includes an output shaft 61, a drive gear 62, a sensor magnet for an output part 63, and a magnet holder 64.

The output shaft 61 has a tubular shape that extends in the axial direction Z of the motor shaft 41. In this manner, since the output shaft 61 extends in the same direction as the motor shaft 41, it is possible to simplify the structure of the deceleration mechanism 50 that transmits rotation of the motor shaft 41 to the output shaft 61. In the present embodiment, the output shaft 61 has a cylindrical shape centered on an output central axis J3 which is a virtual axis. The output central axis J3 is parallel to the central axis J1 and is disposed away from the central axis J1 in the radial direction. That is, the motor shaft 41 and the output shaft 61 are disposed away from each other in the radial direction of the motor shaft 41.

The output shaft 61 has an opening 61d that opens to the lower side. In the present embodiment, the output shaft 61 opens to both sides in the axial direction. The output shaft 61 has a spline groove in the lower inner circumferential surface. The output shaft 61 includes a cylindrical output shaft main body 61a and a flange part 61b that protrudes radially outward from the output shaft main body 61a in the output central axis J3. The output shaft 61 is disposed at a position at which it overlaps the rotor main body 42 in the radial direction of the motor shaft 41. The lower side end of the output shaft 61, that is, the opening 61d, is disposed above the lower side end of the motor part 40. In the present embodiment, the lower side end of the motor part 40 is the lower side end of the motor shaft 41.

A driven shaft DS is inserted into and connected to the output shaft 61 from the lower side via the opening 61d. More specifically, when a spline part provided on the outer circumferential surface of the driven shaft DS is fitted to the spline groove provided on the inner circumferential surface of the output shaft 61, the output shaft 61 and the driven shaft DS are connected to each other. A driving force of the electric actuator 10 is transmitted to the driven shaft DS via the output shaft 61. Thereby, the electric actuator 10 rotates the driven shaft DS around the output central axis J3.

As described above, in the axial direction Z, the side to which the opening 61*d* into which the driven shaft DS is inserted opens is the same side on which the motor part 40 is disposed with respect to the deceleration mechanism 50. Therefore, the motor part 40 can be disposed on the side of a mounting object to which the electric actuator 10 is attached. Thereby, in the radial direction of the driven shaft DS, a space outside the driven shaft DS can be used as a space in which the motor part 40 is disposed. Therefore, the electric actuator 10 can be brought closer before being attached to the mounting object. Therefore, according to the present embodiment, it is possible to obtain the electric actuator 10 through which an attachment height when attached to the mounting object can be reduced. In the present embodiment, the mounting object is a vehicle.

In addition, according to the present embodiment, a direction in which the motor shaft 41 extends from the motor part 40 toward the deceleration mechanism 50 is upward, and a direction in which the opening 61*d* of the output shaft 61 opens is the opposite direction. Therefore, a direction in which the output shaft 61 extends from the deceleration mechanism 50 can be opposite to a direction in which the motor shaft 41 extends from the motor part 40 toward the deceleration mechanism 50. Thereby, the motor shaft 41 and the output shaft 61 can be disposed in the radial direction of the motor shaft 41 in an overlapping manner, and it is possible to reduce the size of the electric actuator 10 in the axial direction Z. In addition, since the output shaft 61 overlaps the rotor main body 42 in the radial direction of the motor shaft 41, it is possible to further reduce the size of the electric actuator 10 in the axial direction Z. Thereby, it is easy to further reduce the attachment height of the electric actuator 10 when attached to the mounting object.

In addition, according to the present embodiment, the lower side end of the motor part 40 is disposed below the opening 61*d*. Therefore, the motor part 40 can be disposed closer to the mounting object. Thereby, it is easy to further reduce the attachment height of the electric actuator 10 when attached to the mounting object.

The drive gear 62 is fixed to the output shaft 61 and engages with the output gear 53. In the present embodiment, the drive gear 62 is fixed to a part of the outer circumferential surface of the output shaft main body 61*a* that is above the flange part 61*b*. The drive gear 62 comes in contact with the upper surface of the flange part 61*b*. Although not shown, the drive gear 62 is a sector gear that extends from the output shaft 61 toward the output gear 53 and increases in width when it approaches the output gear 53. A gear part is provided at the end of the drive gear 62 on the side of the output gear 53. The gear part of the drive gear 62 engages with the gear part of the output gear 53.

The magnet holder 64 is a substantially cylindrical member that extends in the axial direction Z with respect to the output central axis J3. The magnet holder 64 opens to both sides in the axial direction. The magnet holder 64 is disposed on the upper side of the output shaft 61 and on the outside of the deceleration mechanism 50 in the radial direction. The magnet holder 64 penetrates the circuit board 70 in the axial direction Z. The inside of the magnet holder 64 is connected to the inside of the output shaft 61. The upper end of the driven shaft DS inserted into the output shaft 61 is press-fitted to the magnet holder 64. Thereby, the magnet holder 64 is fixed to the driven shaft DS.

The sensor magnet for an output part 63 has an annular shape centered on the output central axis J3. The sensor magnet for an output part 63 is fixed to the outer circumferential surface at the upper side end of the magnet holder 64. When the magnet holder 64 is fixed to the driven shaft DS, the sensor magnet for an output part 63 is fixed to the driven shaft DS via the magnet holder 64. The sensor magnet for an output part 63 faces the upper side surface of the circuit board 70 via a gap.

When the motor shaft 41 rotates around the central axis J1, the eccentric shaft part 41*a* revolves in the circumferential direction with respect to the central axis J1. Revolving of the eccentric shaft part 41*a* is transmitted to the external gear 51 through the third bearing 44*c*, and the external gear 51 swings while a position inscribing the inner circumferential surface of the hole 51*a* and the outer circumferential surface of the pin 53*b* changes. Thereby, a position at which the gear part of the external gear 51 engages with the gear part of the internal gear 52 changes in the circumferential direction. Therefore, a rotation force of the motor shaft 41 is transmitted to the internal gear 52 through the external gear 51.

Here, in the present embodiment, since the internal gear 52 is fixed, it does not rotate. Therefore, due to a reaction force for a rotation force transmitted to the internal gear 52, the external gear 51 rotates around the eccentric shaft J2. In this case, a direction in which the external gear 51 rotates is opposite to a direction in which the motor shaft 41 rotates. Rotation of the external gear 51 around the eccentric shaft J2 is transmitted to the output gear 53 through the hole 51*a* and the pin 53*b*. Thereby, the output gear 53 rotates around the central axis J1. Rotation of the motor shaft 41 that is decelerated is transmitted to the output gear 53.

When the output gear 53 rotates, the drive gear 62 engaged with the output gear 53 rotates around the output central axis J3. Thereby, the output shaft 61 fixed to the drive gear 62 rotates around the output central axis J3. Accordingly, rotation of the motor shaft 41 is transmitted to the output shaft 61 through the deceleration mechanism 50.

In the present embodiment, the rotation direction of the motor shaft 41 and the rotation direction of the output shaft 61 are the same. That is, when the motor shaft 41 rotates in the first rotation direction $\theta1$, the output shaft 61 rotates in the first rotation direction $\theta1$. When the motor shaft 41 rotates in the second rotation direction $\theta2$, the output shaft 61 rotates in the second rotation direction $\theta2$.

The circuit board 70 is disposed above the rotor main body 42. The circuit board 70 is disposed above the deceleration mechanism 50. The circuit board 70 has a plate shape with a plate surface that is orthogonal to the axial direction Z. The circuit board 70 has the through-hole 70*a* that penetrates the circuit board 70 in the axial direction Z. The motor shaft 41 passes through the through-hole 70*a*. Thereby, the motor shaft 41 penetrates the circuit board 70 in the axial direction Z. The circuit board 70 is electrically connected to the stator 43 through a bus bar (not shown). That is, the circuit board 70 is electrically connected to the motor part 40.

The motor part sensor 71 is fixed to the upper surface of the circuit board 70. More specifically, the motor part sensor 71 is fixed to a part of the upper side surface of the circuit board 70 that faces the sensor magnet for a motor part 45 in the axial direction Z via a gap. The motor part sensor 71 is a magnetic sensor that detects a magnetic field of the sensor magnet for a motor part 45. The motor part sensor 71 is, for example, a Hall element. Although not shown, for example, three motor part sensors 71 are provided in the circumferential direction. When the motor part sensor 71 detects a magnetic field of the sensor magnet for a motor part 45, it detects a rotation position of the sensor magnet for a motor part 45 and detects rotation of the motor shaft 41.

In the present embodiment, the deceleration mechanism 50 is connected to the upper side of the motor shaft 41, and the circuit board 70 is disposed above the rotor main body 42 and above the deceleration mechanism 50. Thus, the deceleration mechanism 50 is disposed between the circuit board 70 and the rotor main body 42 in the axial direction Z. Thereby, the motor part sensor 71 fixed to the circuit board 70 can be disposed away from the rotor main body 42 and the stator 43. Therefore, the motor part sensor 71 is unlikely to be influenced by a magnetic field generated from the rotor main body 42 and the stator 43, and it is possible to improve detection accuracy of the motor part sensor 71.

The output part sensor 72 is fixed to the upper surface of the circuit board 70. More specifically, the output part sensor 72 is fixed to a part of the upper side surface of the circuit board 70 that faces the sensor magnet for an output part 63 in the axial direction Z via a gap. The output part sensor 72 is a magnetic sensor that detects a magnetic field of the sensor magnet for an output part 63. The output part sensor 72 is, for example, a Hall element. Although not shown, for example, three output part sensors 72 are provided in the circumferential direction with respect to the output central axis J3. When the output part sensor 72 detects a magnetic field of the sensor magnet for an output part 63, it detects a rotation position of the sensor magnet for an output part 63 and detects rotation of the driven shaft DS.

According to the present embodiment, in the configuration in which the deceleration mechanism 50 is disposed closer to the circuit board 70 than the motor part 40, the drive gear 62 that transmits a rotational driving force to the output gear 53 can be disposed close to the sensor magnet for an output part 63. Thus, it is possible to reduce a distance in the axial direction Z from a part to which a rotational driving force in the output gear 53 is transmitted to a part to which the sensor magnet for an output part 63 is fixed, and it is possible to reduce axial shake at the driven shaft DS in the part to which the sensor magnet for an output part 63 is fixed. Thereby, it is possible to improve the rotation detection accuracy of the driven shaft DS by the output part sensor 72.

The housing 11 accommodates the motor part 40, the deceleration mechanism 50, the output part 60, the circuit board 70, the motor part sensor 71, the output part sensor 72, the bus bar holder 90, and a bus bar (not shown). The housing 11 includes a motor case 30 and the circuit board case 20. The motor case 30 opens to the upper side. The motor case 30 includes a motor case main body 31 and a stator fixing member 37. The circuit board case 20 has a substantially rectangular parallelepiped box shape. The circuit board case 20 is attached to the upper side of the motor case 30 and blocks an opening of the motor case 30. The circuit board case 20 accommodates the circuit board 70. The circuit board case 20 includes a circuit board case main body 21, the metal member 22, and a circuit board case cover 26.

The circuit board case main body 21 and the motor case main body 31 are made of a resin. In the present embodiment, the circuit board case main body 21 and the motor case main body 31 constitute a housing main body 11a. That is, the housing 11 includes the housing main body 11a made of a resin.

The circuit board case main body 21 has a box shape that opens to the upper side. The circuit board case main body 21 includes a bottom wall 21a and a side wall 21b. The bottom wall 21a extends along a plane orthogonal to the axial direction Z. The bottom wall 21a extends radially outward from the motor case main body 31 when viewed in the axial direction Z. The bottom wall 21a blocks an opening on the upper side of the motor case 30. The bottom wall 21a covers the upper side of the stator 43.

The bottom wall 21a has a recess 21c that is recessed from the lower side surface of the bottom wall 21a to the upper side. The bottom wall 21a has a central through-hole 21d that penetrates the bottom wall 21a in the axial direction Z. The central through-hole 21d penetrates the bottom wall 21a from the bottom surface of the recess 21c to the upper side surface of the bottom wall 21a. The central through-hole 21d has a circular shape centered on the central axis J1 when viewed in the axial direction Z. The motor shaft 41 passes through the central through-hole 21d.

The side wall 21b has a rectangular tubular shape that protrudes from the outer edge of the bottom wall 21a to the upper side. The circuit board 70 is accommodated inside the side wall 21b. That is, the circuit board case 20 accommodates the circuit board 70 above the bottom wall 21a. The side wall 21b opens to the upper side. An opening on the upper side of the side wall 21b, that is, an opening on the upper side of the circuit board case 20, is blocked by the circuit board case cover 26. The circuit board case cover 26 is made of, for example, a metal.

The metal member 22 is made of a metal. The metal member 22 is held in the circuit board case main body 21. That is, the metal member 22 is held in the housing main body 11a. The metal member 22 is accommodated and held in the recess 21c. In the present embodiment, a part of the metal member 22 is embedded in the housing main body 11a. Thus, a part or all of the housing main body 11a can be formed using insert molding in which the metal member 22 is inserted into a mold and a resin is poured. Therefore, the housing 11 is easily produced. In the present embodiment, the circuit board case main body 21 within the housing main body 11a is formed by insert molding in which the metal member 22 is inserted into a mold and a resin is poured.

Figure 7:
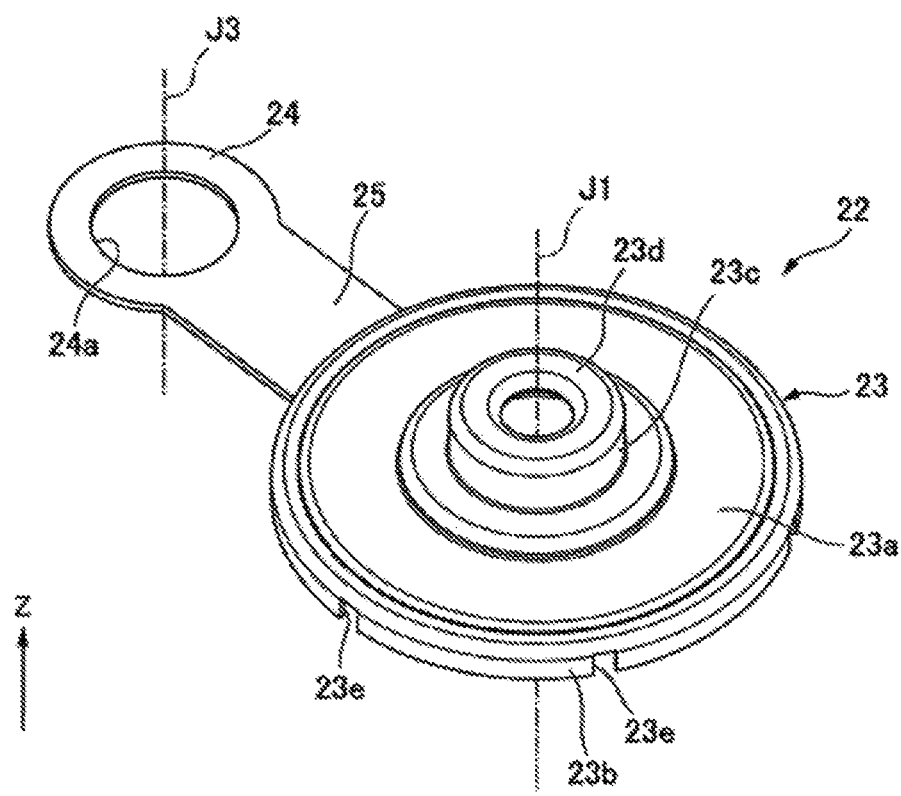
FIG. 7 is a perspective view showing a metal member of the present embodiment.

As shown in FIG. 7, the metal member 22 includes a bearing holding part 23, an arm part 25, and an output shaft support 24. The bearing holding part 23 includes an annular plate part 23a, an outer cylindrical part 23b, an inner cylindrical part 23c, and a top plate part 23d. The annular plate part 23a has an annular plate shape centered on the central axis J1. A plate surface of the annular plate part 23a is orthogonal to the axial direction Z.

The outer cylindrical part 23b has a cylindrical shape that protrudes from the outer peripheral edge of the annular plate part 23a to the lower side. The outer cylindrical part 23b has a plurality of slits 23e that penetrate the wall of the outer cylindrical part 23b in the radial direction. The plurality of slits 23e are disposed at equal intervals over one circumference in the circumferential direction. The slit 23e opens to the lower side.

As shown in FIG. 1, the internal gear 52 is held in the outer cylindrical part 23b in a radially inward direction. Thereby, the deceleration mechanism 50 is held on the lower side surface of the bottom wall 21a via the metal member 22. Although not shown, a plurality of protrusions that protrude radially outward are provided on the outer circumferential surface of the internal gear 52, and the protrusions are inserted into the slits 23e. Thereby, the protrusions are caught on the inner surface of the slits 23e, and it is possible to prevent the internal gear 52 from moving in the circumferential direction with respect to the metal member 22. The outer cylindrical part 23b is embedded and held in the central through-hole 21d in a radially inward direction.

The inner cylindrical part 23c has a cylindrical shape that protrudes from the inner peripheral edge of the annular plate part 23*a* to the upper side. The first bearing 44*a* is held in the inner cylindrical part 23*c* in a radially inward direction. Thereby, the bearing holding part 23 holds the first bearing 44*a*. The inner cylindrical part 23*c* protrudes to the upper side from the bottom wall 21*a*. The inner cylindrical part 23*c* is disposed on the side wall 21*b* in a radially inward direction. The inner cylindrical part 23*c* penetrates the circuit board 70 in the axial direction Z via the through-hole 70*a* and protrudes to the upper side from the circuit board 70.

Thereby, at least a part of the first bearing 44*a* held in the inner cylindrical part 23*c* is inserted into the through-hole 70*a*. Therefore, the motor shaft 41 can be supported by the first bearing 44*a* at a position close to the part of the motor shaft 41 to which the sensor magnet for a motor part 45 is attached. Thereby, it is possible to prevent the axis of the part of the motor shaft 41 to which the sensor magnet for a motor part 45 is attached from being displaced and it is possible to prevent the position of the sensor magnet for a motor part 45 from being displaced. Therefore, it is possible to reduce a decrease in the rotation detection accuracy of the motor shaft 41 by the motor part sensor 71. In addition, since the first bearing 44*a* and the circuit board 70 can be disposed in an overlapping manner when viewed in the radial direction, it is easy to reduce the size of the electric actuator 10 in the axial direction Z.

In this specification, "the bearing holding part holds the first bearing" means that it is sufficient for the bearing holding part to position the first bearing in the radial direction, and the first bearing may not be fixed to the bearing holding part. In the present embodiment, the first bearing 44*a* is fitted to the inner cylindrical part 23*c*, and thus positioned in the radial direction. The first bearing 44*a* is not fixed to the inner cylindrical part 23*c*.

The top plate part 23*d* protrudes in a radially inward direction from the upper side end of the inner cylindrical part 23*c*. The top plate part 23*d* has an annular shape centered on the central axis J1 and has a plate shape with a plate surface that is orthogonal to the axial direction Z. The upper side end of the motor shaft 41 passes through the inside of the top plate part 23*d*. The inner peripheral edge of the top plate part 23*d* is curved downward. The top plate part 23*d* covers the upper side of the first bearing 44*a*.

As shown in FIG. 2, a preload member 47 is disposed between the top plate part 23*d* and the first bearing 44*a* in the axial direction Z. That is, the electric actuator 10 includes the preload member 47. The preload member 47 is an annular wave washer that extends in the circumferential direction. The preload member 47 comes in contact with the lower side surface of the top plate part 23*d* and the upper side end of the outer ring of the first bearing 44*a*. The preload member 47 applies a downward preload to the outer ring of the first bearing 44*a*. Thereby, the preload member 47 applies a downward preload to the first bearing 44*a* and applies a downward preload to the motor shaft 41 through the first bearing 44*a*.

The motor shaft 41 that receives a downward preload by the preload member 47 is supported by the second bearing 44*b* shown in FIG. 1 from below. More specifically, in the second bearing 44*b*, the outer ring is supported by an annular convex part 32*a* of a motor housing part 32 to be described below from below, and the motor shaft 41 is supported from below by the inner ring fixed to the outer circumferential surface of the motor shaft 41. In the present embodiment, the second bearing 44*b* corresponds to a support that supports the motor shaft 41 from below. That is, the electric actuator 10 includes the second bearing 44*b* as a support.

When the second bearing 44*b* as a support is provided, even if a downward preload is applied to the motor shaft 41 by the preload member 47, it is possible to prevent the motor shaft 41 from moving downward. The preload member 47 applies a downward preload to the motor shaft 41 and presses the motor shaft 41 against the second bearing 44*b* as a support. Thereby, while no vibration is applied to the electric actuator 10, the position of the motor shaft 41 in the axial direction Z can be maintained at the lowermost position. Therefore, even when vibration is applied to the electric actuator 10 and the motor shaft 41 moves in the axial direction Z, it is possible to prevent the motor shaft 41 from moving downward, and a direction in which the motor shaft 41 moves can be set as an upward direction.

Thus, the sensor magnet for a motor part 45 faces the upper side surface of the circuit board 70 in the axial direction Z via a gap, and the motor part sensor 71 is fixed to a part of the upper side surface of the circuit board 70 that faces the sensor magnet for a motor part 45 in the axial direction Z via a gap. That is, the sensor magnet for a motor part 45 attached to the motor shaft 41 is disposed above the motor part sensor 71. Thereby, when a direction in which the motor shaft 41 moves when vibration is applied to the electric actuator 10 can be set as an upward direction, even if the motor shaft 41 moves, the sensor magnet for a motor part 45 moves in a direction away from the motor part sensor 71. Therefore, it is possible to prevent the sensor magnet for a motor part 45 from coming in contact with the motor part sensor 71. Here, when the motor shaft 41 moves upward, the preload member 47 undergoes compressive elastic deformation in the axial direction Z.

As described above, according to the present embodiment, when a direction in which the preload member 47 applies a preload to the motor shaft 41 is set as a direction toward the motor part sensor 71 from the sensor magnet for a motor part 45, it is possible to prevent the sensor magnet for a motor part 45 from coming in contact with the motor part sensor 71. Thereby, the electric actuator 10 having a structure that can reduce damage to the sensor magnet for a motor part 45 and the motor part sensor 71 is obtained.

In addition, for example, a case in which the sensor magnet for a motor part is disposed below the circuit board and the motor part sensor is attached to the lower side surface of the circuit board is considered. In this case, as described above, in order to prevent the sensor magnet for a motor part and the motor part sensor from coming in contact with each other, an upward preload is applied to the motor shaft by the preload member, and a direction in which the motor shaft moves when vibration is applied to the electric actuator may be set as a downward direction. However, in this case, when the motor shaft moves downward, the magnet holder that holds the sensor magnet for a motor part or the sensor magnet for a motor part may come in contact with the motor case in which the motor part is accommodated or the like. Thereby, the position of the sensor magnet for a motor part with respect to the motor shaft may be shifted upward. In this state, when the motor shaft returns to its original position, there is a risk of the sensor magnet for a motor part coming in contact with the motor part sensor positioned on the upper side.

On the other hand, according to the present embodiment, the motor shaft 41 penetrates the circuit board 70 disposed above the rotor main body 42 in the axial direction Z, and the sensor magnet for a motor part 45 is attached to a part of the motor shaft 41 that protrudes upward from the circuit board 70. Therefore, a direction in which the motor shaft 41 moves when vibration is applied to the electric actuator 10 can be set as a direction away from the motor case 30 in which the motor part 40 is accommodated. Thus, when the motor shaft 41 moves, it is possible to prevent the sensor magnet for a motor part 45 and the magnet holder 46 from coming in contact with the motor case 30, and it is possible to prevent the position of the sensor magnet for a motor part 45 from being displaced with respect to the motor shaft 41. Thereby, it is possible to prevent the sensor magnet for a motor part 45 and the motor part sensor 71 from coming in contact with each other when the motor shaft 41 is returned to its original position in the axial direction Z. Therefore, it is possible to further reduce damage to the sensor magnet for a motor part 45 and the motor part sensor 71.

In the present embodiment, as shown in FIG. 2, a gap S is provided between the upper side end of the motor shaft 41, the sensor magnet for a motor part 45, the magnet holder 46, and the circuit board case cover 26 in the axial direction Z. The gap S is larger than a maximum movement range of the motor shaft 41 that moves upward when vibration is applied to the electric actuator 10. Therefore, even if the motor shaft 41 moves upward, it is possible to prevent the upper side end of the motor shaft 41, the sensor magnet for a motor part 45, and the magnet holder 46 from coming in contact with the circuit board case cover 26.

In addition, according to the present embodiment, since the first bearing 44a is a ball bearing, when a preload is applied to the first bearing 44a by the preload member 47, it is possible to improve the shaft holding accuracy of the motor shaft 41 by the first bearing 44a. In addition, a preload applied by the preload member 47 is transmitted to the second bearing 44b, the third bearing 44c, and the fourth bearing 44d, which are a ball bearing, through the motor shaft 41. Therefore, it is possible to improve the shaft holding accuracy of the motor shaft 41 by the ball bearings. In addition, since one preload member 47 can apply a preload to the first bearing 44a and also apply a preload to the motor shaft 41, it is possible to reduce an increase in the number of components of the electric actuator 10.

In addition, according to the present embodiment, the magnet holder 46 that holds the sensor magnet for a motor part 45 includes the supported part 46f that is supported on a part of the motor shaft 41 from below. Thus, when the motor shaft 41 moves upward, even if the magnet holder 46 comes in contact with the housing 11, it is possible to prevent the magnet holder 46 from moving downward with respect to the motor shaft 41 by the supported part 46f. Thus, it is possible to prevent the sensor magnet for a motor part 45 from moving downward with respect to the motor shaft 41, and when the motor shaft 41 is returned to its original position in the axial direction Z, it is possible to prevent the sensor magnet for a motor part 45 from coming in contact with the motor part sensor 71.

In addition, as in the present embodiment, when the detected part is a magnet, when it comes in contact with another member, damage, for example, chipping of a part of the detected part, easily occurs. Therefore, the effect of reducing damage to the sensor magnet for a motor part 45 as the detected part described above is particularly beneficial when the detected part is a magnet as in the present embodiment.

In addition, according to the present embodiment, the preload member 47 is a wave washer. Thus, for example, compared to when the preload member is a coil spring or the like, it is possible to reduce the size of the electric actuator 10 in the axial direction Z.

As shown in FIG. 1, the arm part 25 extends to the outside of the motor shaft 41 in the radial direction from the bearing holding part 23. As shown in FIG. 7, the arm part 25 has a plate shape with a plate surface that is orthogonal to the axial direction Z. The arm part 25 has a rectangular shape when viewed in the axial direction Z. The arm part 25 connects the bearing holding part 23 and the output shaft support 24. Thereby, the size of a part of the metal member 22 other than the bearing holding part 23 and the output shaft support 24 is easily minimized and the size of the metal member 22 is easily reduced. Therefore, the production cost of the housing 11 is easily reduced and the weight of the housing 11 is easily reduced.

The output shaft support 24 is connected to the outer side end of the arm part 25 in the radial direction. The output shaft support 24 has an annular shape centered on the output central axis J3 and has a plate shape with a plate surface that is orthogonal to the axial direction Z. In this manner, according to the present embodiment, since the output shaft support 24 and the arm part 25 have a plate shape, the output shaft support 24 and the arm part 25 can be easily produced by pressing such as punching or bending a metal plate member. In the present embodiment, the metal member 22 is a single member formed by pressing a metal plate member.

The output shaft support 24 has a through-hole 24a that penetrates the output shaft support 24 in the axial direction Z. As shown in FIG. 1, a fitting part 61c, which is an upper side end of the output shaft main body 61a, is fitted into the through-hole 24a. That is, the output shaft 61 has the fitting part 61c fitted to the through-hole 24a. Thereby, the output shaft support 24 supports the output shaft 61.

In this manner, in the present embodiment, according to the metal member 22 made of a metal, the first bearing 44a can be held and the output shaft 61 can be supported. Thereby, the motor shaft 41 supported by the first bearing 44a and the output shaft 61 can be disposed with favorable relative position accuracy. In addition, since the housing main body 11a in which the metal member 22 is held is made of a resin, it is possible to reduce the weight of the housing 11. As described above, according to the present embodiment, it is possible to obtain the electric actuator 10 having a structure through which it is possible to reduce the weight and it is possible to prevent the relative position accuracy between the motor shaft 41 and the output shaft 61 from decreasing. In addition, since the metal member 22 is made of a metal, it has higher strength and heat resistance than that of a resin. Thus, even if an external force and heat are applied to the housing 11, it is possible to prevent the metal member 22 from being largely deformed or damaged, and it is possible to prevent the motor shaft 41 and the output shaft 61 from being shifted.

In addition, according to the present embodiment, when the fitting part 61c is fitted into the through-hole 24a, the output shaft 61 can be easily supported and can be easily positioned with respect to the metal member 22. Therefore, the electric actuator 10 can be easily assembled.

The motor case main body 31 includes the motor housing part 32 and an output part holding part 33. The motor housing part 32 has a tubular shape which has a bottom and opens to the upper side. The motor housing part 32 has a cylindrical shape centered on the central axis J1. The motor part 40 is accommodated in the motor housing part 32. That is, the motor part 40 is accommodated in the motor case main body 31.

Here, in this specification "the motor part is accommodated in the motor case main body" means that a portion of the motor part is accommodated in the motor case main body and another portion of the motor part protrudes to the outside of the motor case main body. In the present embodiment, the lower side part of the motor shaft 41, the rotor main body 42, the stator 43, and the second bearing 44*b* are accommodated in the motor case main body 31, that is, the motor housing part 32.

The motor housing part 32 has the annular convex part 32*a* that protrudes from the bottom surface of the motor housing part 32 to the upper side. Although not shown, the annular convex part 32*a* has an annular shape centered on the central axis J1. The annular convex part 32*a* supports the outer ring of the second bearing 44*b* from below. A part of the annular convex part 32*a* in a radially inward direction overlaps the inner ring of the second bearing 44*b* and the lower side end of the motor shaft 41 when viewed in the axial direction Z. Thus, even if a downward preload is applied to the motor shaft 41 and thus the inner ring of the second bearing 44*b* and the lower side end of the motor shaft 41 are disposed to protrude downward from the outer ring of the second bearing 44*b*, it is possible to prevent the inner ring of the second bearing 44*b* and the lower side end of the motor shaft 41 from coming in contact with the bottom surface of the motor housing part 32.

The output part holding part 33 protrudes radially outward from the motor housing part 32. The output part holding part 33 includes a base 33*a* and an output shaft holding part 33*b*. The base 33*a* protrudes radially outward from the motor housing part 32. The output shaft holding part 33*b* protrudes from the outer side end of the base 33*a* in the radial direction to both sides in the axial direction. The output shaft holding part 33*b* has a cylindrical shape centered on the output central axis J3. The output shaft holding part 33*b* opens to both sides in the axial direction. The inside of the output shaft holding part 33*b* penetrates the base 33*a* in the axial direction Z.

A cylindrical bush 65 is fitted into the output shaft holding part 33*b*. A flange part that protrudes to the outside in the radial direction with respect to the output central axis J3 is provided at the upper side end of the bush 65. The flange part of the bush 65 is supported by the upper side end of the output shaft holding part 33*b* from below. A part of the output shaft main body 61*a* that is below the flange part 61*b* is fitted into the bush 65. The bush 65 supports the output shaft 61 so that it is rotatable with respect to the output central axis J3. The flange part 61*b* is supported by the upper side end of the output shaft holding part 33*b* through the flange part of the bush 65 from below. The lower side opening 61*d* of the output shaft 61 is disposed below the bush 65.

The stator fixing member 37 has a tubular shape which has a bottom and opens to the upper side. The stator fixing member 37 has a cylindrical shape centered on the central axis J1. The stator fixing member 37 is fitted into the motor housing part 32. A plurality of through-holes disposed in the circumferential direction are provided at the bottom of the stator fixing member 37. A plurality of protrusions provided on the bottom of the motor housing part 32 are fitted into the through-holes of the stator fixing member 37.

The upper side end of the stator fixing member 37 protrudes upward from the motor housing part 32. The second bearing 44*b* is held on the bottom of the stator fixing member 37.

The outer circumferential surface of the stator 43 is fixed to the inner circumferential surface of the stator fixing member 37. The stator fixing member 37 is made of a metal. For example, the motor case 30 can be formed using insert molding in which a resin is poured when the stator fixing member 37 is inserted into a mold.

The bus bar holder 90 is disposed in the upper side opening of the stator fixing member 37. The bus bar holder 90 has an annular shape centered on the central axis J1 and has a plate shape with a plate surface that is orthogonal to the axial direction Z. The bus bar holder 90 holds a bus bar (not shown). The bus bar holder 90 covers the upper side of the stator 43.

The disclosure is not limited to the above embodiment, and other configurations can be used. The number of magnetic poles of the rotor magnet and the number of magnetic poles of the sensor magnet for a motor part are not particularly limited as long as the numbers are 2 or more. In addition, the type of the magnets is not particularly limited. An angle φ at which the magnetic pole of the rotor magnet is shifted from the magnetic pole of the sensor magnet for a motor part is not particularly limited as long as it is larger than 0°.

Figure 8:
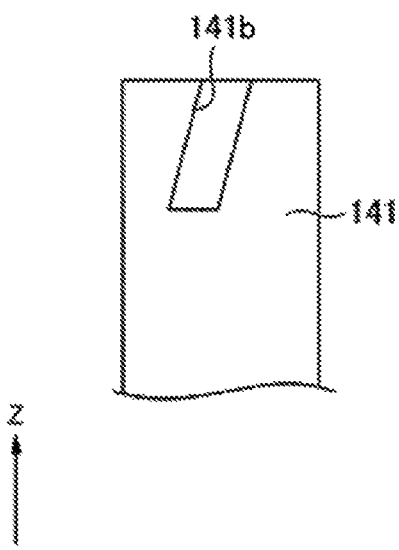
FIG. 8 is a diagram showing a part of a motor shaft which is another example of the present embodiment.

The first positioning part of the motor shaft may have a configuration of a positioning recess 141*b* of a motor shaft 141 shown in FIG. 8. The positioning recess 141*b* is a recess that is recessed from the outer circumferential surface of the motor shaft 141 in a radially inward direction. The positioning recess 141*b* opens to the upper side and is positioned on one side in the circumferential direction from the upper side to the lower side. According to this configuration, when the supported part 46*f* as a convex part is fitted to the lower side end of the positioning recess 141*b*, the sensor magnet for a motor part 45 can be disposed to be shifted in the circumferential direction with respect to the upper side end of the positioning recess 141*b*. Thus, using the upper side end of the positioning recess 141*b*, the rotor magnet 42*b* can be positioned in the circumferential direction and the sensor magnet for a motor part 45 can be disposed to be shifted in the circumferential direction with respect to the rotor magnet 42*b*. Therefore, the rotor magnet 42*b* and the sensor magnet for a motor part 45 are easily disposed with the magnetic poles Np and Sp that are shifted in the circumferential direction.

The preload member is not particularly limited as long as it can apply a preload to the motor shaft. The preload member may be a coil spring or the like. In addition, the preload member may come in direct contact with the motor shaft and apply a preload. In addition, a preload member that applies a preload to the motor shaft may be provided separately from the member that applies a preload to a ball bearing such as the first bearing.

The support is not particularly limited as long as it can support the motor shaft from below. The support may be, for example, a convex part that protrudes from the bottom of the motor housing part to the upper side. In this case, for example, the convex part is in point contact with the center of the lower side end of the motor shaft and directly supports the motor shaft from below.

The motor part sensor may be a magnetic sensor other than the Hall element and may be a sensor other than the magnetic sensor. The motor part sensor may be, for example, a magnetoresistive element or an optical sensor. The detected part is not particularly limited as long as it is detected by the motor part sensor, and may be a part other than the magnet. The detected part may be directly attached to the motor shaft. This similarly applies to the output part sensor and the like.

The housing main body may be a single member. The housing main body may be formed as a single body by injection molding. In this case, the metal member is held in the housing main body after the housing main body is formed. The shape of the housing main body is not particularly limited. The housing main body may have a polygonal shape, a circular shape, or an elliptical shape when viewed in the axial direction. The housing main body may not be made of a resin and made of, for example, a metal.

The metal member is not particularly limited. The metal member may be constituted by connecting a plurality of other members. The metal member may not be provided. The first bearing, the second bearing, the third bearing, and the fourth bearing may not be a ball bearing, but may be a sliding bearing or the like. The configuration of the deceleration mechanism is not particularly limited. A direction in which the output shaft extends may be different from a direction in which the motor shaft extends.

The opening of the output shaft into which the driven shaft is inserted may open to the upper side. A position at which the output shaft is disposed is not particularly limited.

The application of the electric actuator according to the above embodiment is not particularly limited, and the electric actuator may be mounted on a component other than the vehicle.

Next, an embodiment of an actuator device will be described.

Figure 9:
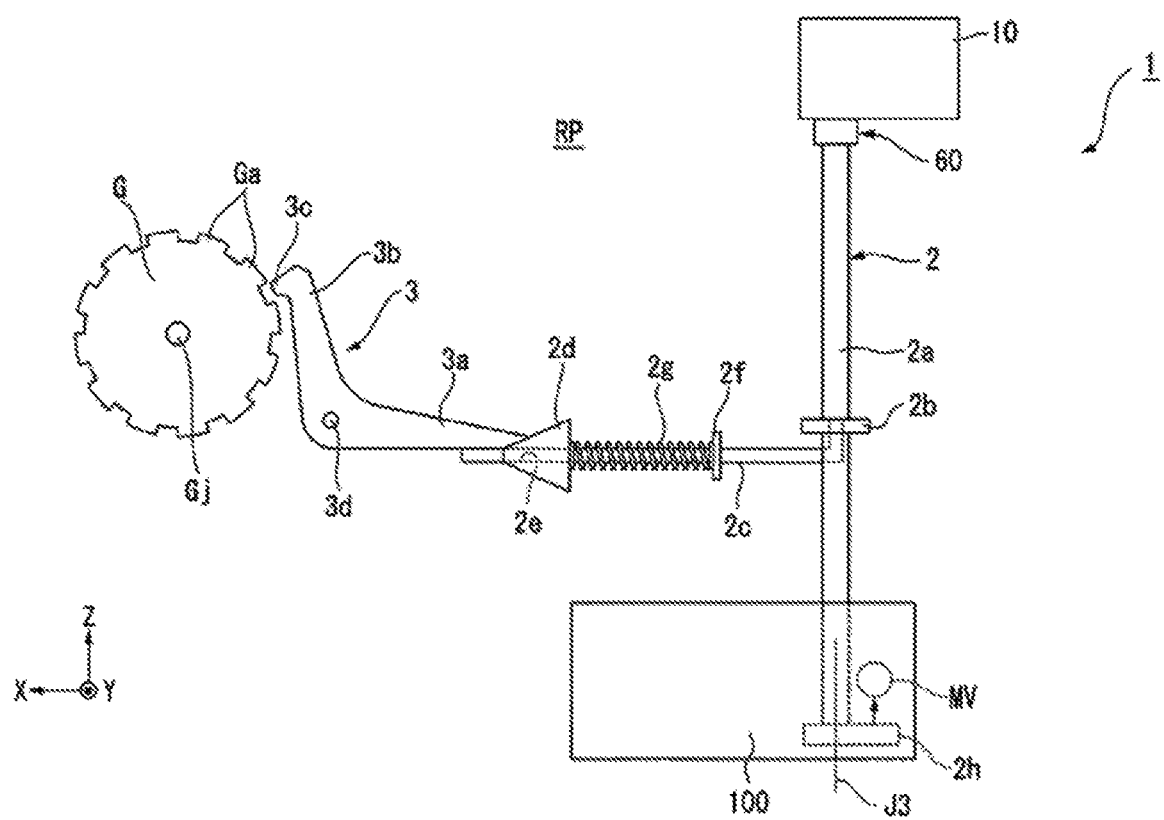
FIG. 9 is a diagram of the actuator device of the present embodiment when viewed from the left side.
Figure 10:
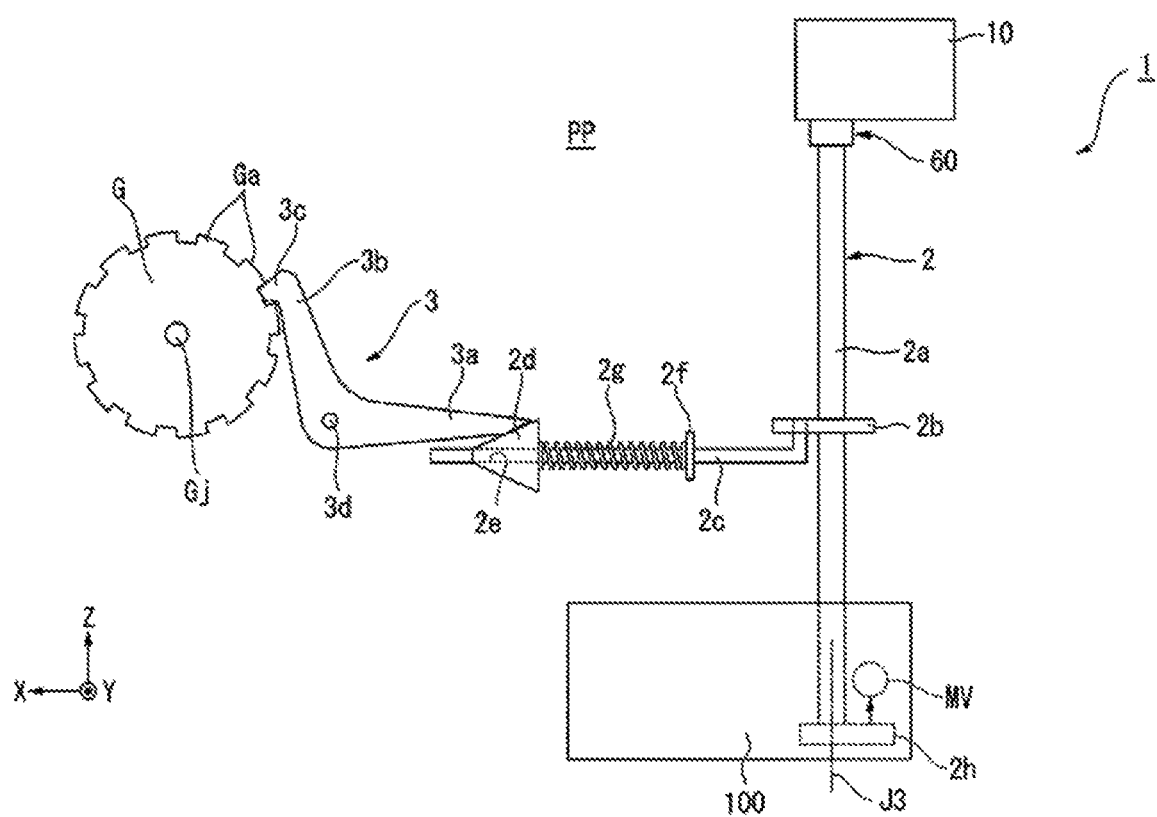
FIG. 10 is a diagram of the actuator device of the present embodiment when viewed from the left side.
Figure 11:
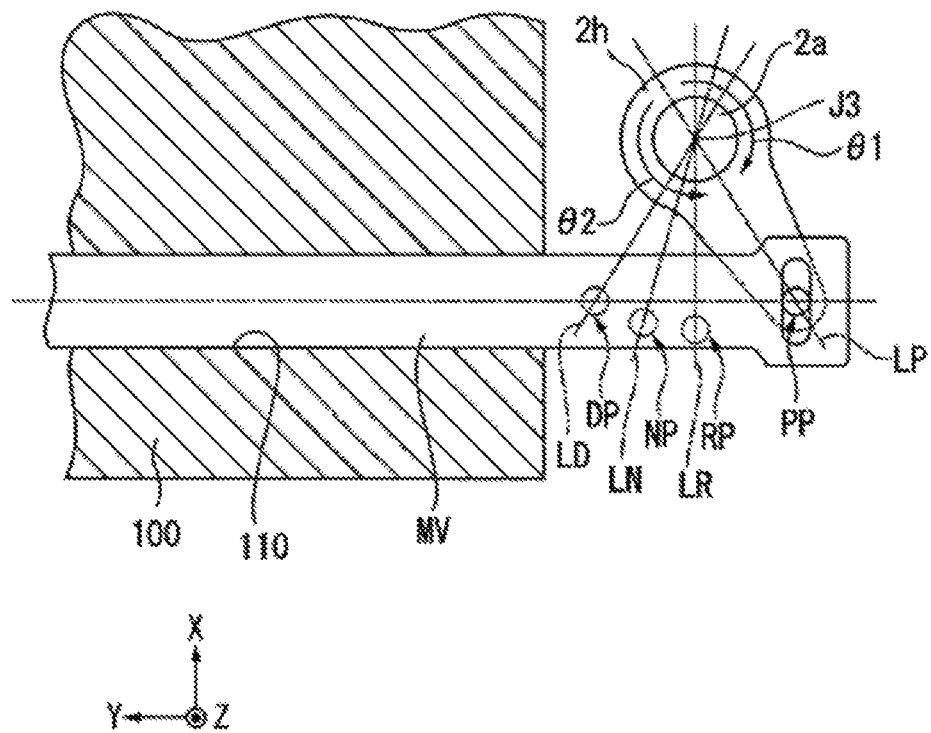
FIG. 11 is a cross-sectional view of a part of the actuator device of the present embodiment when viewed from above.

In FIG. 9 to FIG. 11, the X axis direction is a direction orthogonal to the Z axis direction, and the Y axis direction is a direction orthogonal to both the X axis direction and the Z axis direction. A direction parallel to the X axis direction is referred to as a "longitudinal direction X" and a direction parallel to the Y axis direction is referred to as a "left to right direction Y." In the longitudinal direction X, the positive side in the X axis direction is referred to as the front side, and the negative side in the X axis direction is referred to as the rear side. In the left to right direction Y, the positive side in the Y axis direction is referred to as the left side and the negative side in the Y axis direction is referred to as the right side.

Here, the front side, the rear side, the left side, the right side, the longitudinal direction, and the left to right direction are only names for describing relative positional relationships between respective parts, and actual disposition relationships and the like may be disposition relationships or the like other than disposition relationships indicated by such names.

An actuator device 1 of the present embodiment shown in FIG. 9 and FIG. 10 is a shift-by-wire type actuator device that is provided in a vehicle and is driven based on a shift operation performed by a driver. The actuator device 1 moves a manual valve MV based on a shift operation performed by a driver and switches a hydraulic circuit in an oil passage body 100. Thereby, the actuator device 1 switches a gear of a vehicle, for example, between park, reverse, neutral, and drive.

In addition, the actuator device 1 switches a lock gear G between a locked state and an unlocked state based on a shift operation performed by a driver. The actuator device 1 brings the lock gear G into a locked state when a gear of the vehicle is at park and brings the lock gear G into an unlocked state when a gear of the vehicle is a position other than park. The lock gear G is a gear connected to an axle. The lock gear G has a plurality of teeth parts Ga on the outer circumferential surface and rotates about a rotation shaft Gj that extends in the left to right direction Y.

The actuator device 1 includes the oil passage body 100 having an oil passage therein, the electric actuator 10 described above, a movable part 2, and a lock arm 3. The oil passage body 100 has a hydraulic circuit constituted by a plurality of oil passages therein. As shown in FIG. 11, the oil passage body 100 has an insertion hole 110 that is recessed in the left to right direction Y. The insertion hole 110 is connected to the oil passage in the oil passage body 100. The manual valve MV is disposed in the insertion hole 110 so that it is movable in the left to right direction Y. Thereby, the manual valve MV is attached to the oil passage body 100. The manual valve MV has a bar shape that extends in the left to right direction Y. When the manual valve MV moves in the left to right direction Y, a connection between oil passages in the oil passage body 100 changes and the hydraulic circuit is switched.

As shown in FIG. 9, the movable part 2 includes a manual shaft 2a, a connecting part 2b, a rod 2c, a support 2d, a flange part 2f, a coil spring 2g, and an arm part 2h. The manual shaft 2a has a cylindrical shape that extends in the axial direction Z. The manual shaft 2a is disposed along the output central axis J3. The manual shaft 2a corresponds to the driven shaft DS shown in FIG. 1. That is, the manual shaft 2a is connected to the output shaft 61. Thereby, the movable part 2 is connected to the output shaft 61.

The connecting part 2b is fixed to the manual shaft 2a. The connecting part 2b has a rectangular plate shape that extends in one direction. Although not shown, a fixing hole that penetrates the connecting part 2b in the axial direction Z is provided at one end of the connecting part 2b. The manual shaft 2a passes through and is fixed to the fixing hole. Thereby, one end of the connecting part 2b is fixed to the manual shaft 2a. The connecting part 2b extends from the manual shaft 2a in a radially outward direction of the output central axis J3.

The rod 2c is disposed so that it is movable in the longitudinal direction X. The rear side end of the rod 2c is connected to the connecting part 2b. The support 2d has a truncated cone-shape centered on an axis that extends in the longitudinal direction X. The outer diameter of the support 2d increases from the front side to the rear side. The support 2d has a through-hole 2e that penetrates the support 2d in the longitudinal direction X. The front side end of the rod 2c passes through the through-hole 2e. The support 2d is movable in the longitudinal direction X with respect to the rod 2c. For example, the support 2d and the rod 2c are disposed concentrically.

The flange part 2f is fixed to the rod 2c on the rear side relative to the support 2d. The coil spring 2g extends in the longitudinal direction X. The coil spring 2g is disposed between the support 2d and the flange part 2f in the longitudinal direction X. The rod 2c passes through the inside of the coil spring 2g. The rear end of the coil spring 2g is fixed to the flange part 2f. The front end of the coil spring 2g is fixed to the support 2d. The coil spring 2g expands and contracts when the support 2d relative moves in the longitudinal direction X with respect to the rod 2c, and applies an elastic force in the longitudinal direction X to the support 2d.

The arm part 2h is fixed to the lower end of the manual shaft 2a. As shown in FIG. 11, the arm part 2h extends from the manual shaft 2a in a radially outward direction of the output central axis J3. The tip of the arm part 2h is connected to the manual valve MV.

The movable part 2 is driven by the electric actuator 10. Specifically, the manual shaft 2a is rotated about the output central axis J3 by the electric actuator 10. According to rotation of the manual shaft 2a, the connecting part 2b and the arm part 2h also rotate about the output central axis J3. When the connecting part 2b rotates about the output central axis J3, the rod 2c moves in the longitudinal direction X. The rod 2c moves to the rear side when the connecting part 2b rotates in the first rotation direction θ1. When the connecting part 2b rotates in the second rotation direction θ2, the rod 2c moves to the front side. When the rod 2c moves in the longitudinal direction X, the support 2d, the flange part 2f, and the coil spring 2g also move in the longitudinal direction X.

The electric actuator 10 switches the position of the movable part 2 between at least a parking position PP and a non-parking position based on a shift operation performed by a driver. The non-parking position is a position other than the parking position PP, and in the present embodiment, as shown in FIG. 11, includes a drive position DP, a neutral position NP, and a reverse position RP. That is, in the present embodiment, the electric actuator 10 switches the position of the movable part 2 between the drive position DP, the neutral position NP, the reverse position RP, and the parking position PP based on a shift operation performed by a driver. In the present embodiment, the parking position PP corresponds to a lock position and the non-parking position corresponds to a non-lock position.

The drive position DP is a position of the movable part 2 when a gear of the vehicle is at drive. The neutral position NP is a position of the movable part 2 when a gear of the vehicle is at neutral. The reverse position RP is a position of the movable part 2 when a gear of the vehicle is at reverse. The parking position PP is a position of the movable part 2 when a gear of the vehicle is at park. FIG. 9 shows a case in which the movable part 2 is, for example, at the reverse position RP, among non-parking positions. FIG. 10 and FIG. 11 show a case in which the movable part 2 is at the parking position PP.

As shown in FIG. 11, at the parking position PP, the arm part 2h is disposed along an imaginary line LP inclined in the second rotation direction θ2 with respect to the longitudinal direction X when viewed from the above. Although not shown, at the reverse position RP, the arm part 2h is disposed along an imaginary line LR that extends in the longitudinal direction X when viewed from the above. At the neutral position NP, the arm part 2h is disposed along an imaginary line LN inclined in the first rotation direction θ1 with respect to the longitudinal direction X when viewed from the above. At the drive position DP, the arm part 2h is disposed along an imaginary line LD inclined in the first rotation direction θ1 relative to the imaginary line LN with respect to the longitudinal direction X when viewed from the above.

The position of the tip of the arm part 2h in the left to right direction Y is from the right side to the left side in order of the parking position PP, the reverse position RP, the neutral position NP, and the drive position DP. The position of the tip of the arm part 2h in the left to right direction Y changes and the position of the manual valve MV in the left to right direction Y to which the tip of the arm part 2h is connected changes. That is, the position of the manual valve MV in the left to right direction Y is from the right side to the left side in order of the parking position PP, the reverse position RP, the neutral position NP, and the drive position DP. In this manner, the arm part 2h moves the manual valve MV.

As shown in FIG. 9, the lock arm 3 is disposed on the front side of the movable part 2. The lock arm 3 is disposed so that it is rotatable with respect to a rotation shaft 3d. The rotation shaft 3d is a shaft that extends in the left to right direction Y. The lock arm 3 includes a first part 3a and a second part 3b. The first part 3a extends from the rotation shaft 3d to the rear side. The rear end of the first part 3a comes in contact with the outer circumferential surface of the support 2d. The second part 3b extends from the rotation shaft 3d toward the upper side and is slightly inclined with respect to the front side. The second part 3b has an engagement part 3c that protrudes to the front side at its upper end.

The lock arm 3 moves when the movable part 2 moves. More specifically, the lock arm 3 rotates about the rotation shaft 3d when the rod 2c and the support 2d move in the longitudinal direction X. When the manual shaft 2a rotates in the second rotation direction θ2 from the reverse position RP shown in FIG. 9, the connecting part 2b rotates in the second rotation direction θ2, and the rod 2c and the support 2d move to the front side. Since the outer diameter of the support 2d increases from the front side to the rear side, when the support 2d moves to the front side, the first part 3a in contact with the support 2d is lifted upward and the lock arm 3 rotates counterclockwise with respect to the rotation shaft 3d when viewed from the left side. Thereby, the engagement part 3c is closer to the lock gear G, and engages between the teeth parts Ga as shown in FIG. 10. That is, the lock arm 3 engages with the lock gear G connected to an axle at the parking position PP.

In this case, depending on the position of the teeth part Ga, the engagement part 3c may come in contact with the teeth part Ga, the lock arm 3 may not rotate to a position at which the engagement part 3c engages between the teeth parts Ga, and may not move to the parking position PP. Even in such a case, in the present embodiment, since the support 2d is movable in the longitudinal direction X with respect to the rod 2c, a state in which the rod 2c moves to the parking position PP and the support 2d is positioned behind the parking position PP can be allowed. Thereby, it is possible to prevent blocking of rotation of the manual shaft 2a and it is possible to reduce a load applied to the electric actuator 10.

In addition, when the rod 2c is positioned at the parking position PP and the support 2d is positioned behind the parking position PP, the coil spring 2g is compressively deformed. Thus, a forward elastic force is applied to the support 2d by the coil spring 2g. Thereby, a rotation moment is applied from the coil spring 2g to the lock arm 3 through the support 2d in a counterclockwise rotation direction with respect to the rotation shaft 3d when viewed from the left side. Therefore, when the lock gear G rotates and the position of the teeth part Ga is shifted, the lock arm 3 rotates and the engagement part 3c engages between the teeth parts Ga.

When the manual shaft 2a rotates from the parking position PP to the first rotation direction θ1 shown in FIG. 10, the connecting part 2b rotates in the first rotation direction θ1, and the rod 2c and the support 2d move to the rear side. When the support 2d moves to the rear side, the first part 3a lifted by the support 2d moves downward due to its own weight or a force received from the lock gear G, and the lock arm 3 rotates clockwise with respect to the rotation shaft 3d when viewed from the left side. Thereby, the engagement part 3c is separated from the lock gear G and disengaged from a gap between the teeth parts Ga as shown in FIG. 9. That is, the lock arm 3 is disengaged from the lock gear G at the non-parking position, that is, the reverse position RP in FIG. 9.

In this manner, in the present embodiment, when the manual shaft 2a rotates in the first rotation direction θ1, the movable part 2 moves from the parking position PP to the reverse position RP. In the present embodiment, the rotation direction of the motor shaft 41 and the rotation direction of the output shaft 61 are the same. Thus, the rotation direction of the manual shaft 2a and the rotation direction of the motor shaft 41 are the same. Therefore, the motor shaft 41 rotates in the first rotation direction θ1 when the movable part 2 is moved from the parking position PP as a lock position to the reverse position RP as a non-lock position by the electric actuator 10.

Here, in the present embodiment, when the movable part 2 is moved from the parking position PP to the reverse position RP, a larger output is required than when the movable part 2 is moved between non-parking positions or moved from the non-parking position to the parking position PP. The reason for this is as follows. At the parking position PP, the lock arm 3 engages with the lock gear G and rotation of the lock gear G connected to an axle is stopped. Thus, a large load is applied to the lock arm 3 and the first part 3a is strongly pressed against the support 2d. Therefore, a large force is necessary to move the support 2d to the rear side and to move the movable part 2 from the parking position PP to the reverse position RP.

On the other hand, as described above, according to the present embodiment, it is possible to increase an output of the electric actuator 10 when the motor shaft 41 is rotated in the first rotation direction θ1. Therefore, it is possible to prevent the size of the electric actuator 10 from increasing, and it is possible to move the movable part 2 from the parking position PP to the reverse position RP by rotating the manual shaft 2a in the first rotation direction θ1.

On the other hand, when the movable part 2 is moved from the non-parking position to the parking position PP and when the movable part 2 is moved between non-parking positions, the motor shaft 41 rotates in the second rotation direction θ2. As described above, when the motor shaft 41 is rotated in the second rotation direction θ2, an output of the electric actuator 10 decreases. However, when the movable part 2 is moved from the non-parking position to the parking position PP, and when the movable part 2 is moved between non-parking positions, a force required for moving the movable part 2 is relatively small. Therefore, the movable part 2 can be moved even in the second rotation direction θ2 in which an output of the electric actuator 10 decreases.

A particularly large output is likely to be required for switching from the parking position PP to the reverse position RP in a vehicle. Thus, the effects described above are particularly beneficial in an actuator device for a vehicle that is driven based on a shift operation like the actuator device 1 of the present embodiment. In addition, a rotational speed of the manual shaft 2a may decrease when the movable part 2 is moved from the parking position PP to the reverse position RP. Thus, as shown in FIG. 6, a larger rotational torque T can be obtained by reducing the rotational speed N of the motor shaft 41.

Here, while the rotation direction of the motor shaft 41, the rotation direction of the output shaft 61, and the rotation direction of the manual shaft 2a are the same direction in the present embodiment, the disclosure is not limited thereto. The rotation direction of the motor shaft 41, and the rotation direction of the output shaft 61 and the rotation direction of the manual shaft 2a may be opposite to each other. In this case, when the motor shaft 41 rotates in the first rotation direction θ1 and the manual shaft 2a rotates in the second rotation direction θ2, the movable part 2 is moved from the parking position PP to the non-parking position.

While the actuator device 1 described above is a shift-by-wire type actuator device that is driven based on a shift operation performed by a driver, the disclosure is not limited thereto. The actuator device is not particularly limited as long as it is an actuator device in which both directions are used as a rotation direction of an output of an electric actuator, and an output of the electric actuator required differs depending on the rotation direction. The actuator device may be an actuator device other than the actuator device 1 of the above embodiment and an actuator device that switches a lock mechanism so that a large force is necessary when a lock arm engaging with a lock gear is disengaged.

Here, the configurations described in the above electric actuator and actuator device can be appropriately combined within ranges not contradictory to each other.

Features of the above-described embodiments and the modifications thereof may be combined appropriately as long as no conflict arises.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electric actuator, comprising:
   a motor part, having a motor shaft that extends in an axial direction and is rotated in both directions;
   a deceleration mechanism that is connected to the motor shaft;
   a circuit board that is electrically connected to the motor part;
   an output part, having an output shaft to which rotation of the motor shaft is transmitted through the deceleration mechanism;
   a sensor magnet that is attached to the motor shaft;
   a motor part sensor that detects a magnetic field of the sensor magnet and detects rotation of the motor shaft; and
   a sensor magnet holder which is attached to the motor shaft and to which the sensor magnet is fixed,
   wherein the motor part has a rotor magnet that is fixed to the motor shaft,
   wherein the rotor magnet and the sensor magnet each have a plurality of magnetic poles in a circumferential direction around the motor shaft, and
   wherein the magnetic poles of the rotor magnet and the magnetic poles of the sensor magnet are disposed to be shifted from each other in the circumferential direction;
   wherein the motor shaft has a first positioning part that allows the sensor magnet to be positioned in the circumferential direction with respect to the motor shaft;
   wherein the first positioning part is a recess that is recessed in a radially inward direction from an outer circumferential surface of the motor shaft, and
   wherein the sensor magnet holder has a convex part that is fitted to the recess.

2. The electric actuator according to claim 1, wherein the recess opens to one side in the axial direction and is positioned on one side in the circumferential direction from one side in the axial direction to the other side in the axial direction.

3. The electric actuator according to claim 1, wherein the sensor magnet holder has a second positioning part that allows the sensor magnet to be positioned in the circumferential direction with respect to the sensor magnet holder.

4. The electric actuator according to claim 2, wherein the sensor magnet holder has a second positioning part that allows the sensor magnet to be positioned in the circumferential direction with respect to the sensor magnet holder.

5. An actuator device, comprising:
the electric actuator according to claim 1;
a movable part that is connected to the output shaft; and
a lock arm that moves when the movable part moves,
wherein the electric actuator switches a position of the movable part between at least a lock position and a non-lock position,
wherein the lock arm engages with a lock gear at the lock position and is disengaged from the lock gear at the non-lock position,
wherein the motor shaft rotates in a first rotation direction when the movable part is moved from the lock position to the non-lock position by the electric actuator, and
wherein the magnetic poles of the sensor magnet are disposed to be shifted in the first rotation direction with respect to the magnetic poles of the rotor magnet.

6. An actuator device, comprising:
the electric actuator according to claim 4;
a movable part that is connected to the output shaft; and
a lock arm that moves when the movable part moves,
wherein the electric actuator switches a position of the movable part between at least a lock position and a non-lock position,
wherein the lock arm engages with a lock gear at the lock position and is disengaged from the lock gear at the non-lock position,
wherein the motor shaft rotates in a first rotation direction when the movable part is moved from the lock position to the non-lock position by the electric actuator, and
wherein the magnetic poles of the sensor magnet are disposed to be shifted in the first rotation direction with respect to the magnetic poles of the rotor magnet.

7. The actuator device according to claim 5, wherein the actuator device is provided in a vehicle and is driven based on a shift operation,
wherein the electric actuator switches the position of the movable part based on the shift operation,
wherein the lock position is a position at which a gear of the vehicle is at park, and
wherein the non-lock position is a position at which a gear of the vehicle is a position other than park.

8. The actuator device according to claim 6, wherein
the actuator device is provided in a vehicle and is driven based on a shift operation,
wherein the electric actuator switches the position of the movable part based on the shift operation,
wherein the lock position is a position at which a gear of the vehicle is at park, and
wherein the non-lock position is a position at which a gear of the vehicle is a position other than park.

* * * * *